(12) United States Patent
Orihara et al.

(10) Patent No.: US 9,748,636 B2
(45) Date of Patent: Aug. 29, 2017

(54) ANTENNA DEVICE AND ELECTRONIC APPARATUS

(71) Applicant: DEXERIALS CORPORATION, Tokyo (JP)

(72) Inventors: Katsuhisa Orihara, Tochigi (JP); Norio Saito, Tochigi (JP); Akihiro Fukuda, Tochigi (JP); Manabu Suzuki, Tochigi (JP); Hiroyuki Ryoson, Tochigi (JP); Masayoshi Kanno, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 128 days.

(21) Appl. No.: 14/422,636

(22) PCT Filed: Aug. 21, 2013

(86) PCT No.: PCT/JP2013/072259
§ 371 (c)(1),
(2) Date: Feb. 19, 2015

(87) PCT Pub. No.: WO2014/030662
PCT Pub. Date: Feb. 27, 2014

(65) Prior Publication Data
US 2015/0249282 A1 Sep. 3, 2015

(30) Foreign Application Priority Data

Aug. 23, 2012 (JP) ................. 2012-184183
Feb. 6, 2013 (JP) ................. 2013-021616
Aug. 6, 2013 (JP) ................. 2013-163537

(51) Int. Cl.
*H04M 1/00* (2006.01)
*H01Q 1/24* (2006.01)
(Continued)

(52) U.S. Cl.
CPC .......... *H01Q 1/243* (2013.01); *H01Q 1/2208* (2013.01); *H01Q 1/526* (2013.01); *H01Q 7/00* (2013.01); *H01Q 7/04* (2013.01); *H04M 1/026* (2013.01)

(58) Field of Classification Search
USPC ................. 343/788, 866, 702, 787
See application file for complete search history.

(56) References Cited

U.S. PATENT DOCUMENTS 7,050,007 B2 * 5/2006 Akiho ................. G06K 7/0008
343/702
7,088,304 B2 * 8/2006 Endo ................. G06K 19/0726
343/788
(Continued)

FOREIGN PATENT DOCUMENTS

JP 2005-303541 A 10/2005
JP 2006 270681 A 10/2006
(Continued)

OTHER PUBLICATIONS

Apr. 1, 2016 Extended Search Report issued in European Patent Application No. 13830869.7.
(Continued)

*Primary Examiner* — Jessica Han
*Assistant Examiner* — Hai Tran
(74) *Attorney, Agent, or Firm* — Oliff PLC

(57) ABSTRACT

Provided is an antenna device that achieves good communication characteristics when incorporated into an electronic apparatus. The antenna device incorporated into an electronic apparatus and configured to communicate with an external device via an electromagnetic field signal comprises: a metal plate serving as a first electric conductor, being provided inside a casing of the electronic apparatus and facing the external device; an antenna substrate provided inside the casing of the electronic apparatus, and
(Continued)

having an antenna coil inductively coupled to the external device and wound around thereon; and metal foil serving as a second electric conductor in sheet form, being provided inside the casing of the electronic apparatus, overlapping or being in contact with the metal plate serving as the first electric conductor, and at least partially overlapping a surface of the antenna substrate, the surface being opposite to a surface facing the external device.

23 Claims, 22 Drawing Sheets

(51) Int. Cl.
*H01Q 1/52* (2006.01)
*H01Q 7/04* (2006.01)
*H01Q 7/00* (2006.01)
*H01Q 1/22* (2006.01)
*H04M 1/02* (2006.01)

(56) References Cited

U.S. PATENT DOCUMENTS

| | | | |
|---|---|---|---|
| 7,865,214 B2* | 1/2011 | Kushima | G06K 7/10178 235/492 |
| 2010/0257725 A1* | 10/2010 | Akiho | C01G 49/0018 29/600 |
| 2012/0208606 A1 | 8/2012 | Kubo et al. | |

FOREIGN PATENT DOCUMENTS

| | | |
|---|---|---|
| JP | 2011-119819 A | 6/2011 |
| WO | 2011/125850 A1 | 10/2011 |

OTHER PUBLICATIONS

Nov. 19, 2013 International Search Report issued in International Patent Application No. PCT/JP2013/072259.

* cited by examiner

ANTENNA DEVICE AND ELECTRONIC APPARATUS

FIELD OF THE INVENTION

The present invention relates to an antenna device incorporated into an electronic apparatus and configured to communicate with an external apparatus via an electromagnetic field signal, and an electronic apparatus incorporating said antenna device.

The present application asserts priority rights based on JP Patent Application 2012-184183 filed in Japan on Aug. 23, 2012, JP Patent Application 2013-021616 filed in Japan on Feb. 6, 2013, and JP Patent Application 2013-163537 filed in Japan on Aug. 6, 2013. The total contents of disclosure of the Patent Application of the senior filing date are to be incorporated by reference into the present Application.

BACKGROUND OF THE INVENTION

Electronic apparatuses, such as cellular phones, smartphones, and tablet PCs, have traditionally employed an antenna module for RFID (Radio Frequency Identification) to be equipped with the function of short-distance contactless communication.

This antenna module performs communications by making use of inductive coupling to an antenna coil incorporated into a transmitter, such as a reader/writer. In other words, this antenna module can drive IC configured to convert a magnetic field which an antenna coil receives from a reader/writer into electric power and thereby to function as a communication processing unit.

To surely carry out communications, an antenna module needs to receive a certain value or more of magnetic flux from a reader/writer via an antenna coil. Therefore, an antenna module according to the prior arts is provided with a loop coil in a casing of a cellular phone and receives magnetic flux from a reader/writer via this loop coil.

For example, aiming at improving the characteristics of a loop antenna built in a portable terminal device, Patent Literature 1 proposes a method of laying a flexible cable or a flat cable around a built-in battery.

PRIOR-ART DOCUMENTS

Patent Document

PTL 1: Japanese Patent Application Laid-Open No. 2005-303541

SUMMARY OF THE INVENTION

The invention disclosed in the above-mentioned Patent Literature 1 has a problem that, since the antenna is disposed in a clearance inside a casing, it is hard to attain a fixed form of the antenna, whereby the amount of change in inductance is made larger, and accordingly a wider variation in resonance frequency is caused.

Particularly, in the case where the antenna is formed with a flexible cable, the invention disclosed in the above-mentioned Patent Literature 1 causes a problem that, since it is difficult to adjust the distributed capacitance between wiring, a great number of man-hours is required for adjustment of resonance frequency.

Furthermore, there is a problem with a loop coil, the problem being such that magnetic flux passing through a loop coil from a reader/writer causes currents to flow in opposite directions between one side of the loop coil on which a lead wire of the coil is wound around in one direction and another side of the loop coil on which a lead wire of the coil is wound around in another direction, whereby the efficient coupling is prevented.

The present invention is proposed in view of such actual circumstances, and aims to provide an antenna device which can achieve good communication characteristics when incorporated into an electronic apparatus, and to provide an electronic apparatus incorporating said antenna device.

To solve the above-mentioned problem, an antenna device according to the present invention is incorporated into an electronic apparatus and configured to communicate with an external device via an electromagnetic field signal, and comprises: a first electric conductor provided inside a casing of the electronic apparatus and facing the external device; an antenna coil provided inside the casing of the electronic apparatus and inductively coupled to the external device; and a second electric conductor in sheet form, the second electric conductor being provided inside the casing of the electronic apparatus, overlapping or being in contact with the first electric conductor, and at least partially overlapping a surface of the antenna coil, the surface being opposite to a surface facing the external device.

An antenna device according to the present invention is incorporated into an electronic apparatus and configured to communicate with an external device via an electromagnetic field signal. This antenna device comprises: an antenna coil provided on the inner surface of one member constituting a casing of the electronic apparatus and inductively coupled to the external device; and an electric conductor provided to the one member in such a way as to partially overlap the antenna coil.

A metal layer may be provided on the inner surface of the one member of the electronic apparatus, and the metal layer provided on the inner surface overlaps a part of the electric conductor.

In an electronic apparatus according to the present invention, the electronic apparatus incorporating an antenna device configured to communicate with an external device via an electromagnetic field signal, the antenna device comprises: a first electric conductor facing the external device; an antenna coil inductively coupled to the external device; a second electric conductor in sheet form, the second electric conductor overlapping or being in contact with the first electric conductor, and at least partially overlapping a surface of the antenna coil, the surface being opposite to a surface facing the external device; and a communication processing unit configured to communicate with the external device.

An electronic apparatus according to the present invention incorporates an antenna device configured to communicate with an external device via an electromagnetic field signal. The antenna device comprises: an antenna coil provided on the inner surface of one member constituting a casing of the electronic apparatus and inductively coupled to the external device; and an electric conductor provided in the one member in such a way as to partially overlap the antenna coil.

A metal layer may be provided on the inner surface of the one member of the electronic apparatus, and the metal layer provided on the inner surface overlaps a part of the electric conductor.

An antenna device according to the present invention is incorporated into an electronic apparatus and configured to communicate with an external device via an electromagnetic field signal, and comprises: a first electric conductor provided inside a casing of the electronic apparatus and facing the external device; an antenna coil provided inside the casing of the electronic apparatus and inductively coupled to the external device; and a second electric conductor in sheet form, the second electric conductor being provided inside the casing of the electronic apparatus, being disposed in such a way as to be adjacent to or in contact with and along at least a part of a side face of the first electric conductor, and at least partially overlapping a surface of the antenna coil, the surface being opposite to a surface facing the external device.

Effects of Invention

According to the present invention, in the antenna device, the second electric conductor is made to partially overlap the antenna coil, whereby the antenna device allows a magnetic field in the overlapping area thereof to be repelled and inductive coupling in the overlapping area to be controlled, and thus enables efficient transmission of a current generated in the non-overlapping area. Furthermore, in the antenna device, the second electric conductor partially overlaps the antenna coil, whereby the antenna device allows magnetic flux to be concentrated onto the non-overlapping area, and thus enables efficient power generation in said non-overlapping area. Furthermore, in the antenna device, the second electric conductor also overlaps the first electric conductor, whereby the antenna device allows magnetic flux from the first electric conductor to be induced into an area of the antenna coil, without leakage of said magnetic flux, the area being not overlapped by the second electric conductor, and thus enables efficient inductive coupling.

BRIEF DESCRIPTION OF DRAWINGS

FIG. 6A is a perspective view of the antenna device and FIG. 6B is a side view thereof.

FIG. 11A is a perspective view and FIG. 11B is a cross-sectional view.

FIG. 12A is a perspective view and FIG. 12B is a cross-sectional view.

FIG. 15A is an exploded perspective view of the configuration, FIG. 15B is a configuration example of the metal foil.

FIG. 16A is an exploded perspective view of the configuration, and FIG. 16B is a cross-sectional view thereof.

FIG. 17A illustrates a configuration type in which a magnetic sheet is inserted into the antenna substrate, and FIG. 17B illustrates a configuration type in which a magnetic sheet is disposed in a part of the antenna substrate.

FIG. 18A illustrates an example in which metal foil is bent toward a side opposite to a reader/writer and along a side face of a metal plate; FIG. 18B illustrates an example in which metal foil is bent like the example in FIG. 18A and an antenna substrate is disposed at a position more distant from the reader/writer than that in the example in FIG. 18A; and FIG. 18C illustrates an example in which metal foil is bent toward a reader/writer side and along the side face of a metal plate.

FIG. 19A illustrates an example in which metal foil is bent along the side face of a metal plate, and then disposed in such a way as to overlap a surface facing a reader/writer, and FIG. 19B illustrates an example in which metal foil is bent along the side face of a metal plate and toward a side opposite to a reader/writer, and then disposed in such a way as to overlap a surface opposite to the surface facing the reader/writer.

DETAILED DESCRIPTION OF THE INVENTION

Figure 1:
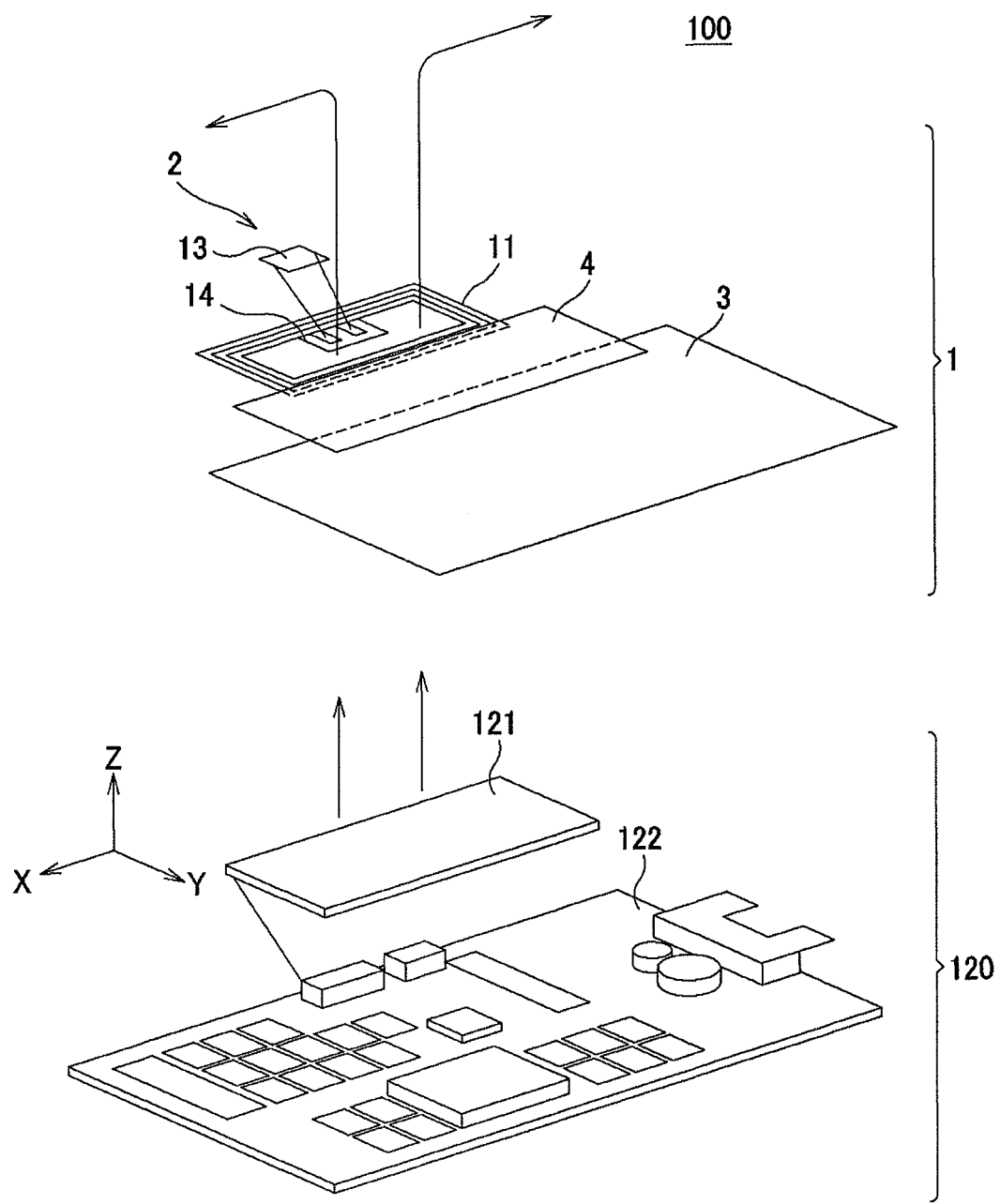
FIG. 1 is a perspective view illustrating a schematic configuration of a wireless communication system incorporating an antenna device according to the present invention.

Hereinafter, an antenna device and an electronic apparatus according to the present invention will be described in detail with reference to the drawings. It should be noted that the present invention is not limited only to the following embodiment, and it is a matter of course that various modifications can be made within the scope not deviating from the gist of the present invention. Moreover, the drawings are schematic and the ratio of each dimension and the like in the drawings may be different from the actual ratio thereof. Specific dimensions and the like should be determined in consideration of the following description. Furthermore, it is a matter of course that the different drawings may have different dimension relationships or different dimension ratios.

An antenna device according to the present invention is a device incorporated into an electronic apparatus and configured to communicate with an external device via an electromagnetic field signal, and, for example, used by being incorporated into a wireless communication system 100 for RFID (Radio Frequency Identification) as illustrated in FIG. 1.

The wireless communication system 100 comprises an antenna device 1 and a reader/writer 120 configured to make access to the antenna device 1. Here, the antenna device 1 and the reader/writer 120 are arranged in such a way as to face each other in the xy-plane of a three-dimensional rectangular coordinate system xyz.

The reader/writer 120 functions as a transmitter configured to transmit a magnetic field in the z-axis direction to the antenna device 1 facing the reader/writer 120 in the xy-plane, and specifically, the reader/writer 120 comprises: an antenna 121 configured to transmit a magnetic field to the antenna device 1; and a control substrate 122 configured to communicate with the antenna device 1 inductively coupled to the control substrate 122 via the antenna 121.

In other words, the reader/writer 120 is provided with the control substrate 122 electrically connected to the antenna 121. On this control substrate 122, a control circuit comprising one or a plurality of electronic parts, such as integrated circuit chips, is mounted. The control circuit performs various kinds of processing, based on data received from the antenna device 1. For example, when data is transmitted to the antenna device 1, the control circuit encodes the data; modulates a carrier wave having a predetermined frequency (for example, 13.56 MHz), based on the encoded data; amplifies the modulated modulation signal; and drives the antenna 121 with the amplified modulation signal. Furthermore, when data is read out from the antenna device 1, the control circuit amplifies a modulation signal of data received by the antenna 121; demodulates to the amplified data modulation signal; and decodes the demodulated data. It should be noted that, in the control circuit, there have been employed an encoding technique and a modulation technique which are employed in common reader/writers, for example, Manchester encoding and ASK (Amplitude Shift Keying) modulation have been employed.

It should be noted that, hereinafter, an antenna device and the like in a contactless communication system will be described, but, it is a matter of course that the antenna device and the like can be applicable likewise also to contactless charging systems, such as Qi.

[Antenna Device]

The antenna device 1 is incorporated inside a casing of an electronic apparatus, such as a cellular phone, which is arranged in such a way as to face the reader/writer 120 in the xy-plane at the time of communication. The antenna device 1 comprises: an antenna module 2 incorporated inside the casing of the electronic apparatus and configured to communicate with the reader/writers 120 inductively coupled thereto; a metal plate 3 as a first electric conductor, provided inside the casing of the electronic apparatus, and facing the reader/writer 120; and metal foil 4 as a second electric conductor in sheet form, provided inside the casing of the electronic apparatus, overlapping or being in contact with the metal plate 3, and at least partially overlapping a surface of an antenna coil 12 of the antenna module 2, the surface being opposite to a surface facing the reader/writer 120.

The antenna module 2 comprises: an antenna substrate 11 having the antenna coil 12 mounted thereon, the antenna coil 12 enabling communication with the reader/writer 120 inductively coupled thereto; and a communication processing unit 13 configured to be driven by a current flowing through the antenna coil 12 and communicate with the reader/writer 120.

Figure 2:
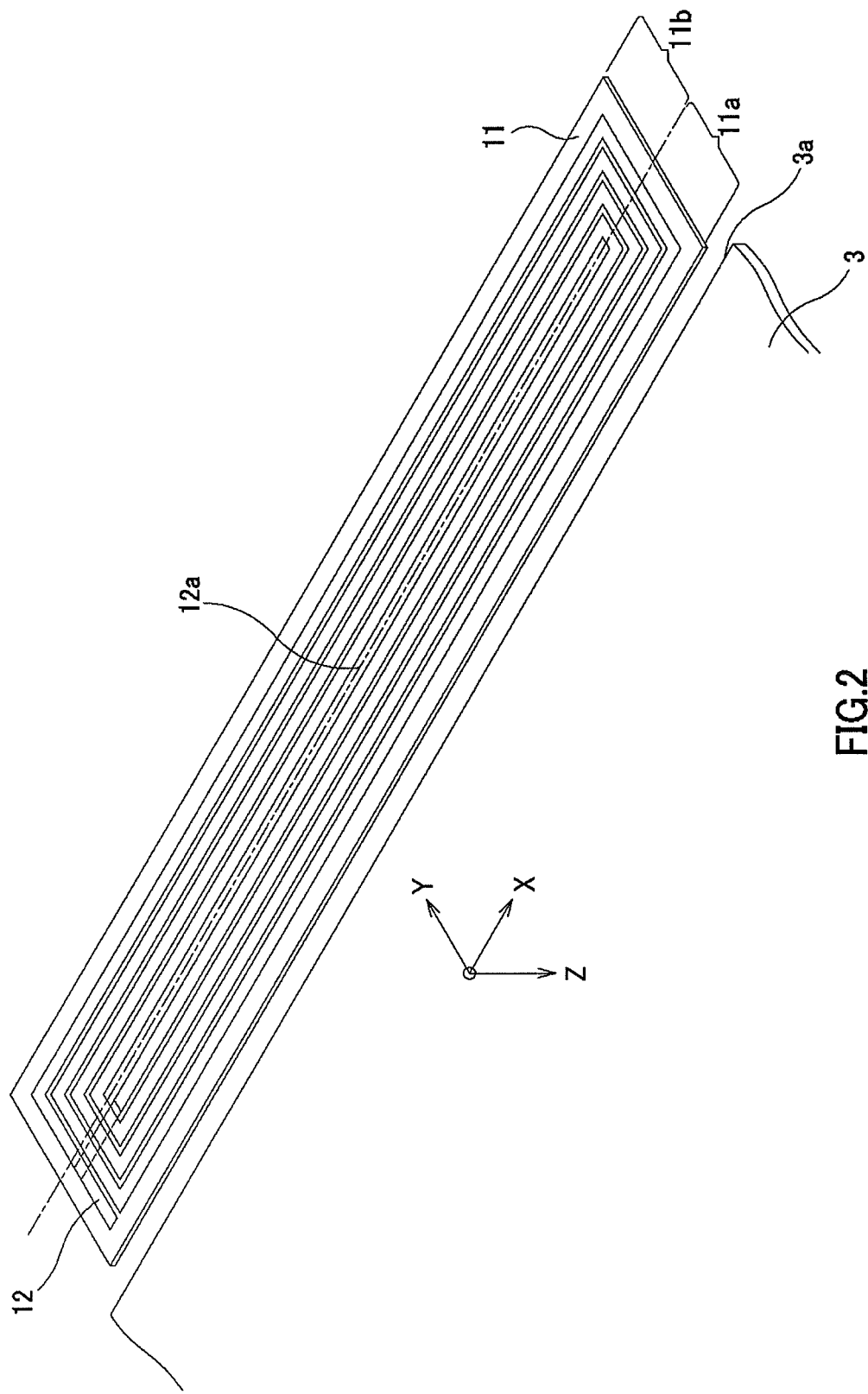
FIG. 2 is a perspective view illustrating an antenna substrate and a metal plate.

On the antenna substrate 11, there are mounted the antenna coil 12 formed by patterning a flexible lead wire, such as a flexible flat cable, and a terminal unit 14 configured to electrically connect the antenna coil 12 to the communication processing unit 13. The antenna substrate 11 has an approximately rectangular shape as illustrated in FIG. 2, and one lead wire of the antenna coil 12 is wound around along the external shape of the antenna substrate 11.

The antenna substrate 11 is disposed in such a way that a principal surface thereof on which the antenna coil 12 is wound around faces the reader/writer 120 in the xy-plane at the time of communication. Furthermore, the antenna substrate 11 is separated at the center 12a of the antenna coil 12 to have one side 11a and another side 11b, wherein, on the one side 11a, the winding direction of a lead wire of the antenna coil 12 is aligned with a direction of current flowing in the longitudinal direction of the antenna substrate 11, meanwhile, on the another side 11b, the winding direction of the lead wire of the antenna coil 12 is aligned with a direction of current flowing opposite to the above-mentioned current flowing on the one side 11a in the longitudinal direction of the antenna substrate 11. Furthermore, the antenna substrate 11 is disposed in such a way that one side edge of the antenna substrate 11 along the longitudinal direction thereof is oriented toward the metal plate 3, in other words, the one side 11a or the another side 11b is oriented toward the metal plate 3. Needless to say, the antenna coil 12 does not necessarily need to be formed on the antenna substrate 11, and the antenna coil 12 may be used alone to form a loop antenna.

When receiving a magnetic field transmitted from the reader/writer 120, the antenna coil 12 is magnetically coupled to the reader/writer 120 by inductive coupling, thereby receiving a modulated electromagnetic wave and sending a received signal to the communication processing unit 13 via the terminal unit.

The communication processing unit 13 is configured to be driven by a current flowing through the antenna coil 12 and communicate with the reader/writer 120. Specifically, the communication processing unit 13 demodulates a received modulation signal, decodes the demodulated data, and writes the decoded data to an internal memory of said communication processing unit 13. Furthermore, the communication processing unit 13 reads out data, which are to be transmitted to the reader/writer 120, from the internal memory; encodes the read-out data; modulates a carrier wave, based on the encoded data; and transmits the modulated wave to the reader/writer 120 via the antenna coil 12 magnetically coupled to the reader/writer 120 by inductive coupling.

It should be noted that the communication processing unit 13 may be driven not by electric power flowing through the antenna coil 12, but by electric power supplied from electric power supply means, such as a battery pack and an external power source, incorporated into an electronic apparatus.

[Metal Plate 3]

Figure 3:
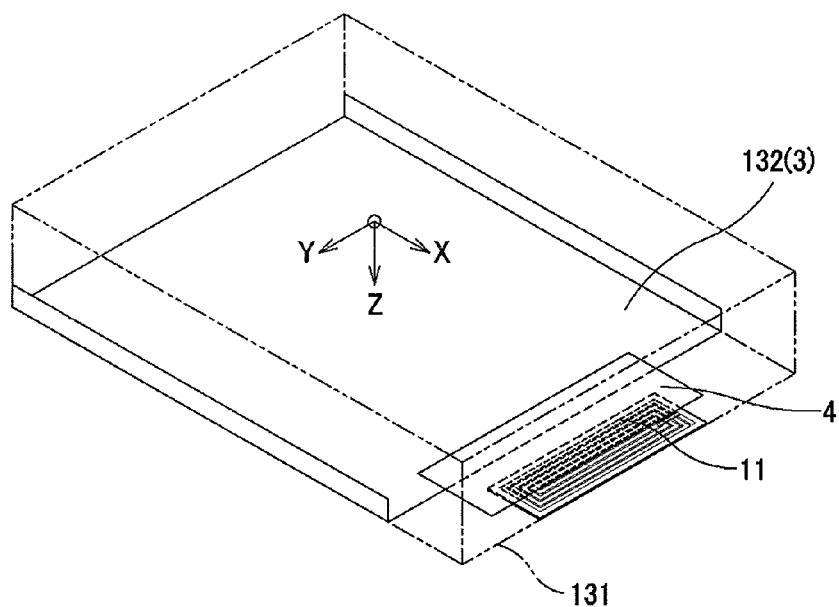
FIG. 3 is a perspective view illustrating an example of the interior of an electronic apparatus according to the present invention, wherein a metal cover attached to the inside of a casing is employed as a first electric conductor.
Figure 4:
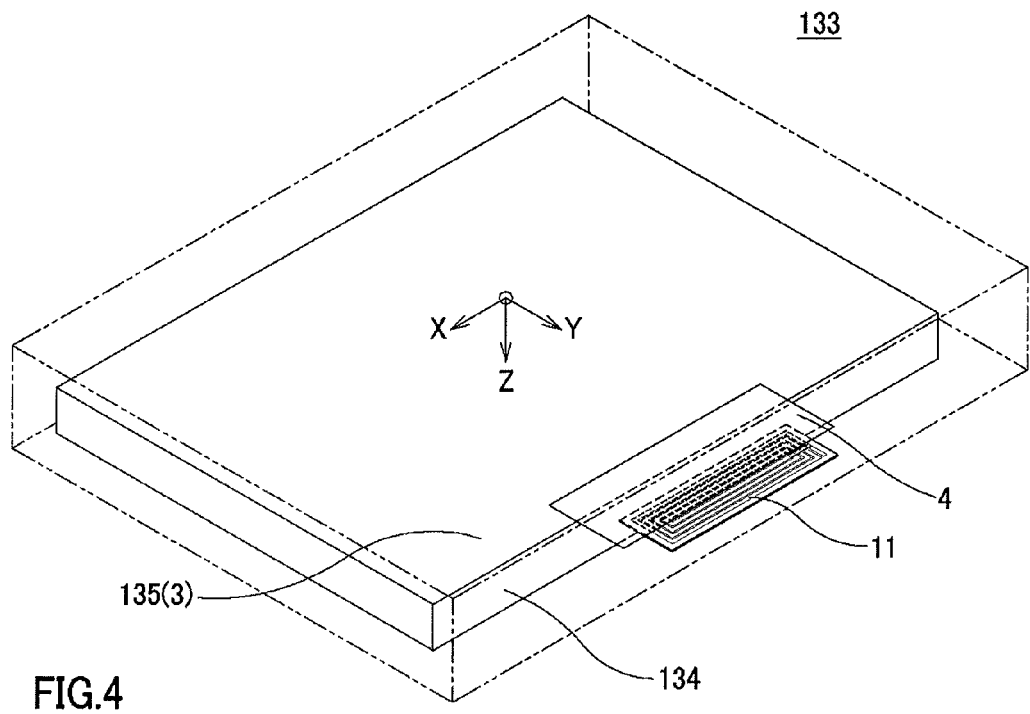
FIG. 4 is a perspective view illustrating an example of the interior of an electronic apparatus according to the present invention, wherein a metal housing for a battery pack is employed as a first electric conductor.
Figure 5:
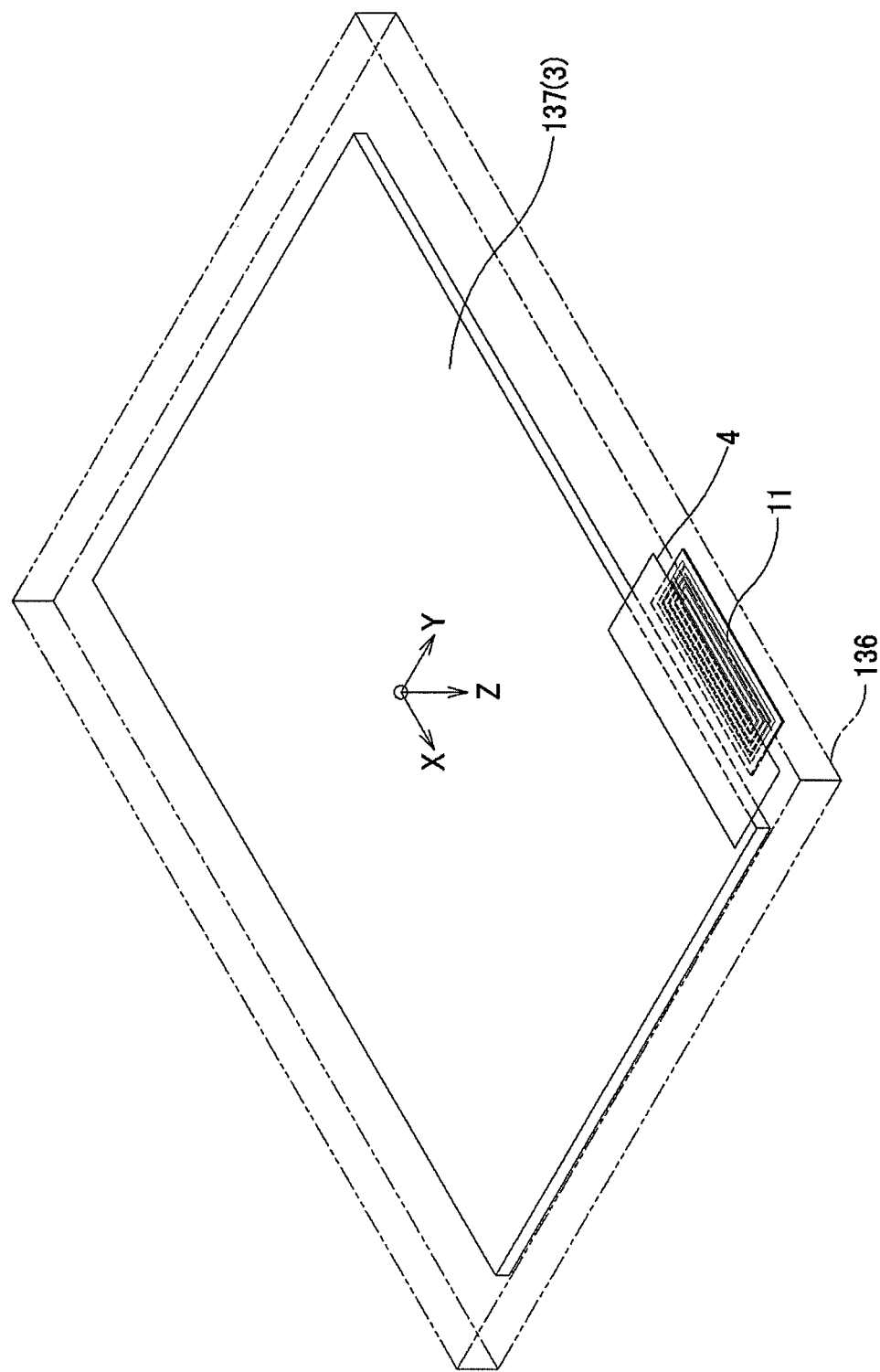
FIG. 5 is a perspective view illustrating an example of the interior of an electronic apparatus according to the present invention, wherein a metal plate provided in the back side of a liquid crystal module is employed as a first electric conductor.

The metal plate 3 constitutes a first electric conductor which is provided inside a casing of an electronic apparatus, such as a cellular phone, a smart phone, or a tablet PC, and configured to face the reader/writer 120 at the time of communication by the antenna module 2. The first electric conductor corresponds to, for example, a metal cover 132 attached to the inner surface of a casing 131 of a smart phone 130 illustrated in FIG. 3; a metal housing 135 of a battery pack 134 housed in a smart phone 133 illustrated in FIG. 4; or a metal plate 137 provided in the back side of a liquid crystal module of a tablet PC 136 illustrated in FIG. 5. Hereinafter, mainly taking a smart phone 133 as an example of electronic apparatuses, there will be given a description in which, in a metal housing 135 of a battery pack 134 housed in the smart phone 133, a principal surface facing the reader/writer 120 at the time of communication serves as a metal plate 3 constituting the first electric conductor.

Figure 6A:
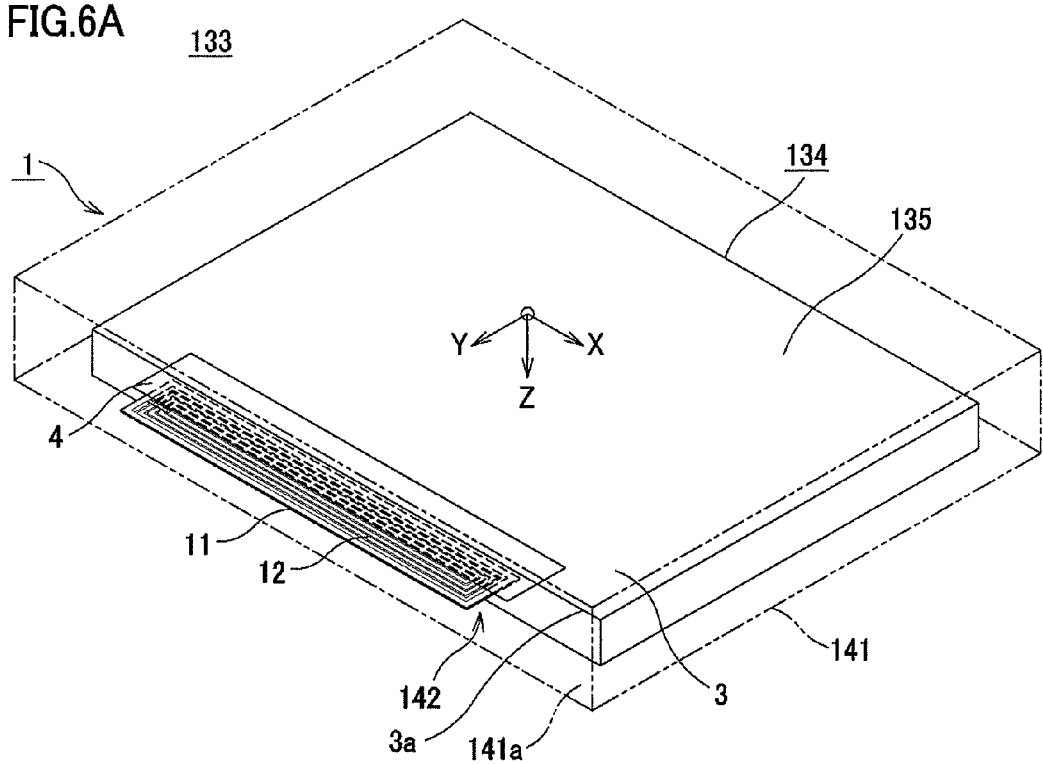
FIG. 6A and FIG. 6B illustrate an antenna device incorporated into an electronic apparatus.

From the viewpoint of miniaturizing the smart phone 133 meanwhile achieving good communication characteristics between the reader/writers 120 and the antenna substrate 11 of the antenna module 2 when the antenna substrate 11 is incorporated into said smart phone 133, the antenna substrate 11 of the antenna module 2 is disposed in the xy-plane of a three-dimensional rectangular coordinate system xyz as illustrated in FIG. 6A, and, for example, in a space 142 between the battery pack 134 provided inside an outer casing 141 of the smart phone 133 and an inner circumference wall 141a of the outer casing 141. Specifically, the antenna substrate 11 is disposed between the inner circumference wall 141a of the outer casing 141 and an end portion 3a of the metal plate 3 of the metal housing 135 of the battery pack 134 as illustrated in FIG. 6B, the metal plate 3 facing the reader/writer 120.

Figure 6B:
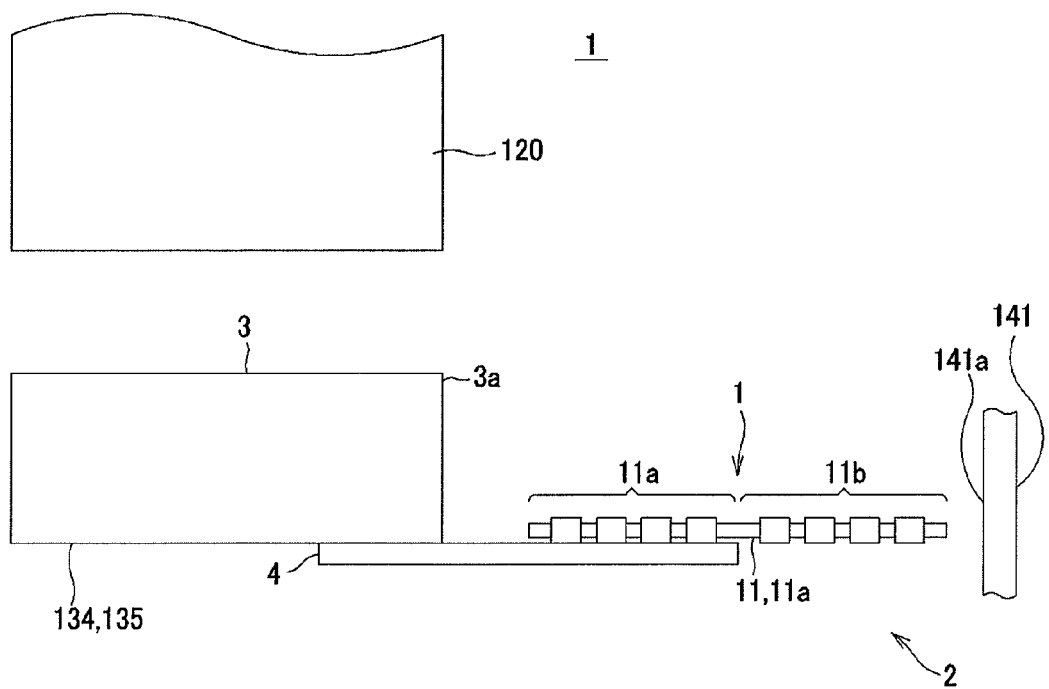

Here, the metal plate 3 constituting the metal housing of the battery pack 134 disposed in the smart phone 133 as illustrated in the cross-sectional view of FIG. 6B allows electricity to comparatively easily flow therethrough, and therefore, when an AC magnetic field is added from outside, an eddy current is generated, whereby the magnetic field is repelled. When magnetic field distribution obtained by such addition of an AC magnetic field from outside is investigated, there is observed a characteristic that the end portion 3a of the metal plate 3 of the battery pack 134, the metal plate 3 facing the reader/writer 120, has a stronger magnetic field.

To achieve good communication characteristics by taking advantage of such strength characteristic of the magnetic field inside the casing 131 of the smart phone 133, the antenna substrate 11 of the antenna module 2 is disposed for example, in such a way that the center 12a of the antenna coil 12 parallel to the z axis as illustrated in FIG. 2 runs through the space 142 between the end portion 3a of the metal plate 3 and the inner circumference wall 141a of the outer casing 141, and one side edge in the longitudinal direction of the antenna substrate 11 is oriented toward the end portion 3a of the metal plate 3, in other words, the one side 11a is oriented toward the end portion 3a of the metal plate 3.

At this time, the antenna substrate 11 may be disposed at a position at which the antenna substrate 11 does not touch the end portion 3a of the metal plate 3 and is separated therefrom. Thus, even in the case where the antenna substrate 11 and the metal plate 3 are disposed in such a way as to be separated from each other due to the constraints of the layout of the casing of the electronic apparatus, the overlapping of later-mentioned metal foil 4 with the metal plate 3 and the antenna substrate 11 allows the antenna device 1 to achieve good communication characteristics.

It should be noted that the antenna substrate 11 may be in contact with the metal plate 3. Furthermore, the antenna substrate 11 may overlap the metal plate 3. At this time, it is beneficial to arrange the antenna substrate 11 in such a way that the one side 11a overlapped with the later-mentioned metal foil 4 overlaps the metal plate 3, meanwhile the another side 11b does not overlap the metal plate 3. If the another side 11b and the metal plate 3 overlap each other, there is a risk of inhibiting the inductive coupling between the another side 11b and magnetic flux of the reader/writer 120.

[Metal Foil 4]

Between the antenna substrate 11 and the metal plate 3, there is provided the metal foil 4 to serve as a second electric conductor in sheet form, the metal foil 4 overlapping or being in contact with the metal plate 3 (a first electric conductor) and at least partially overlapping a surface of the antenna substrate 11, the surface being opposite to a surface facing the reader/writer 120. The overlapping of a part of the antenna substrate 11 by the metal foil 4 causes a magnetic field to be repelled in the overlapped part of the antenna substrate 11, thereby controlling the inductive coupling in the overlapping area and promoting the concentration of magnetic flux onto the non-overlapping area, whereby communication performance is improved.

In other words, in the antenna substrate 11, magnetic flux from the reader/writer, the flux passing through the antenna coil 12 wound around on the principal surface of the substrate, causes currents to flow in opposite directions between one side 11a on which a lead wire of the coil is wound around in one direction and another side 11b on which the lead wire of the coil is wound around in another direction, and, as a result, efficient coupling is prevented.

Hence, in the antenna device 1, the metal foil 4 is made to partially overlap a surface of the antenna substrate 11, the surface being opposite to a surface facing the reader/writer 120, whereby a magnetic field in the overlapping area is repelled and inductive coupling in the overlapping area is controlled accordingly, and thus, current generated in the non-overlapping area can be efficiently transmitted. Furthermore, in the antenna device 1, the metal foil 4 is made to partially overlap a surface of the antenna substrate 11, the surface being opposite to a surface facing the reader/writer 120, whereby magnetic flux is concentrated onto the non-overlapping area, and thus, efficient power generation in said area can be promoted.

Furthermore, in the antenna device 1, the metal foil 4 also overlaps or is in contact with the metal plate 3, and accordingly, without leakage of magnetic flux from the metal plate 3, the magnetic flux can be induced to the non-overlapping area of the antenna substrate 11 by the metal foil 4, whereby efficient inductive coupling can be performed. Furthermore, in the antenna device 1, the metal foil 4 also overlaps the metal plate 3, and accordingly, there can be prevented the current generation caused by inductive coupling in a part of the antenna substrate 11 overlapped by the metal foil 4 due to leakage flux from the metal plate 3.

As the metal foil 4, a good conductor, such as copper foil, is preferably employed, but, it is not necessary to use a good conductor. Furthermore, the thickness of the metal foil 4 is suitably determined according to a communication frequency between the antenna device 1 and the reader/writer 120, and, for example, at a communication frequency of 13.56 MHz, the metal foil having a thickness of 20 µm to 30 µm may be used.

It should be noted that, so long as the metal foil 4 overlaps the metal plate 3 or the antenna substrate 11, the metal foil 4 does not necessarily need to be in contact therewith. However, the metal foil 4 more adjacent to the metal plate 3 and the antenna substrate 11 is more advantageous to the coupling coefficient, and therefore, the metal foil 4 is preferably adjacent thereto or in contact therewith.

Figure 7:
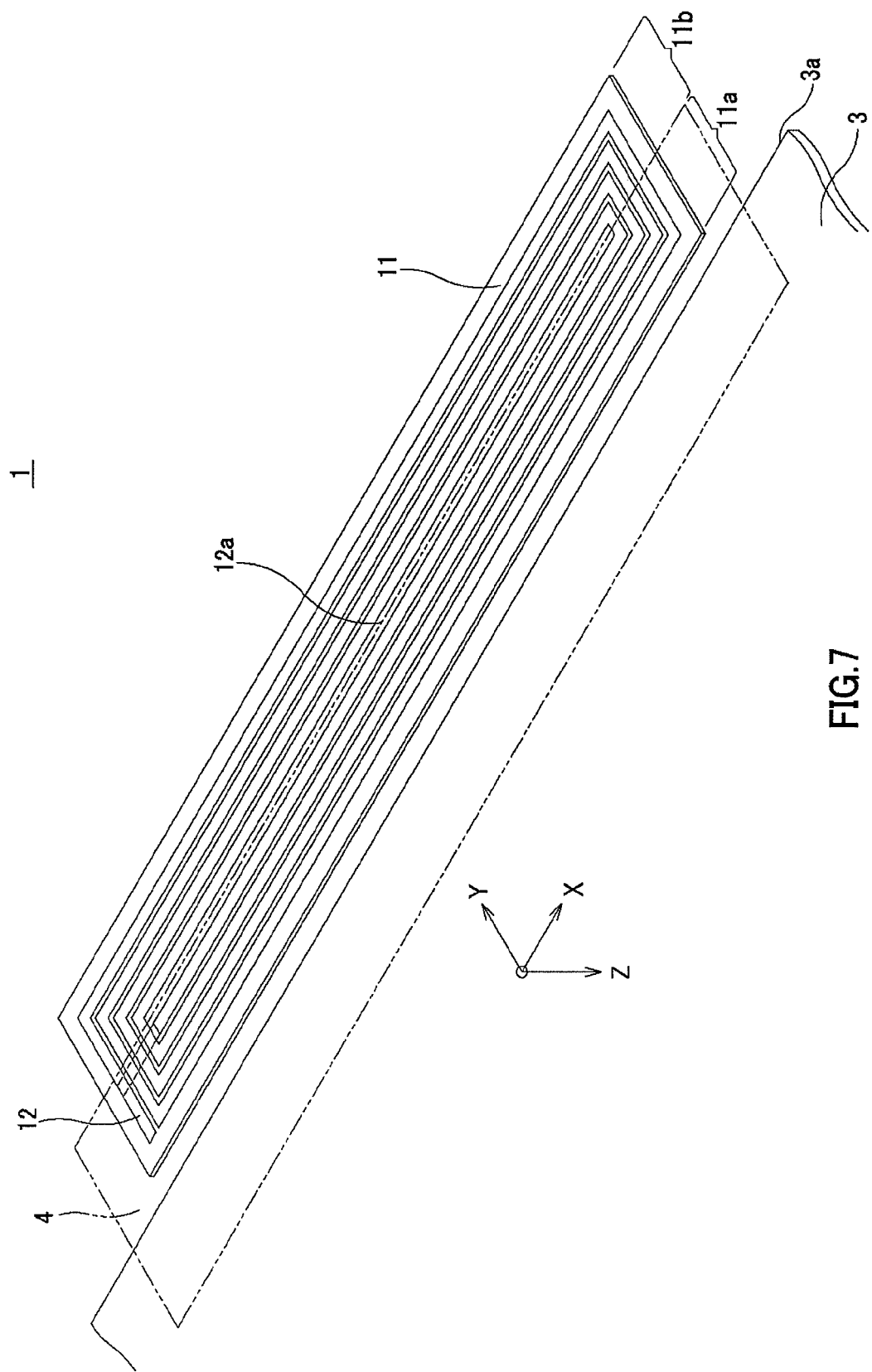
FIG. 7 is a perspective view illustrating a state in which metal foil overlaps one side of an antenna substrate over the full width in the longitudinal direction of the antenna substrate.

As illustrated in FIG. 7, the metal foil 4 preferably overlaps from an end portion of the one side 11a of the antenna substrate 11 to the center 12a of the antenna coil 12. Thus, the metal foil 4 can control the coupling in the one side 11a of the antenna substrate 11, thereby making a relative reduction in the amount of current flowing in a direction opposite to current generated in the another side 11b, and also inducing magnetic flux from the one side 11a of the antenna substrate 11 to the another side 11b thereof and thereby promoting the coupling in the another side 11b, whereby communication characteristics can be improved.

Furthermore, as illustrated in FIG. 7, the metal foil 4 preferably has a width wider than or equal to a width in the longitudinal direction of the one side 11a of the antenna substrate 11, and overlaps the one side 11a of the antenna substrate 11 completely over the longitudinal direction. Thus, the metal foil 4 can control inductive coupling in the one side 11a of the antenna substrate 11, thereby making a relative reduction in the amount of current flowing in a direction opposite to current generated in the another side 11b, and also inducing magnetic flux from the one side 11a of the antenna substrate 11 to the another side 11b thereof and thereby promoting the coupling in the another side 11b, whereby communication characteristics can be improved.

Figure 8:
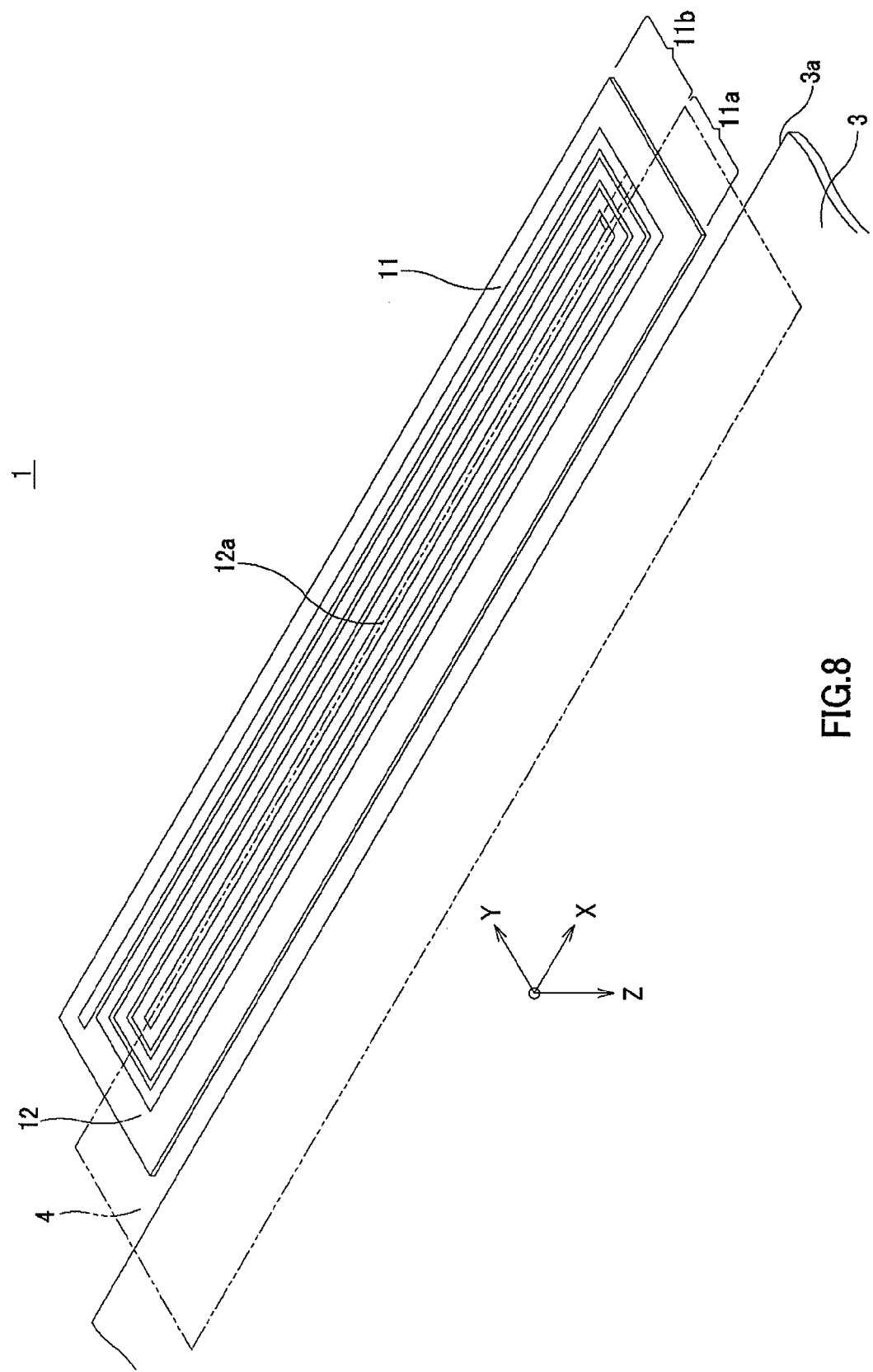
FIG. 8 is a perspective view illustrating an antenna substrate in which the number of turns of the coil on one side overlapped with metal foil is smaller than that on another side not overlapped with metal foil.

It should be noted that, as illustrated in FIG. 8, in the antenna substrate 11, the antenna coil 12 may be wound around in such a manner that the number of turns of the antenna coil 12 on the one side 11a overlapped by the metal foil 4 (for example, 3 turns) is smaller than the number of turns of the antenna coil 12 on the another side 11b not overlapped by the metal foil 4 (for example, 4 turns). In other words, when the beginning and end of the lead wire of one antenna coil are arranged on the another side 11b, the number of turns of the coil lead wire on the another 11b of the antenna substrate 11 is larger than that on the one side 11a positioned across the center 12a of the antenna coil 12. Thus, the number of turns of the coil inductively coupled to magnetic flux from the reader/writer 120 is increased, whereby good communication characteristics can be achieved.

Figure 9:
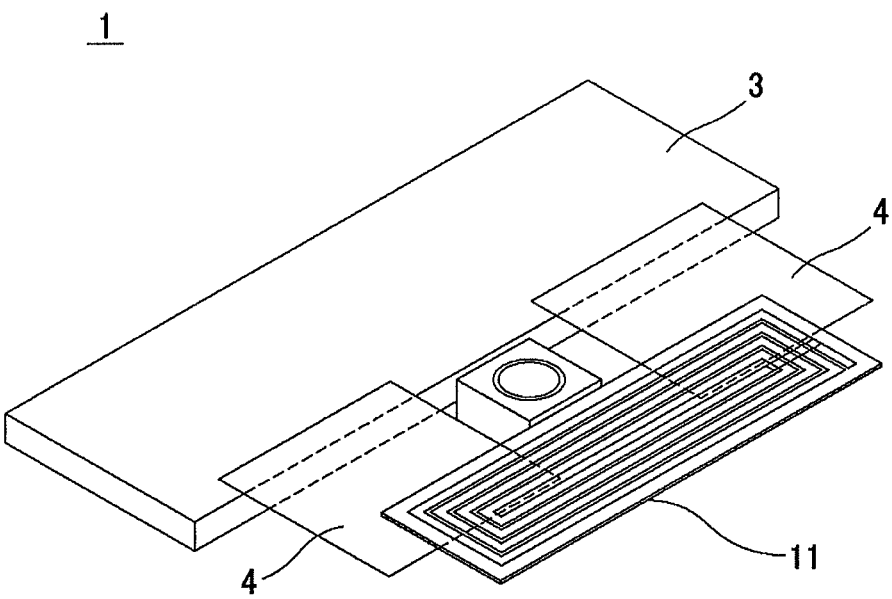
FIG. 9 is a perspective view illustrating an antenna device in which a plurality of metal foil sheets overlaps a metal plate and an antenna substrate.
Figure 10:
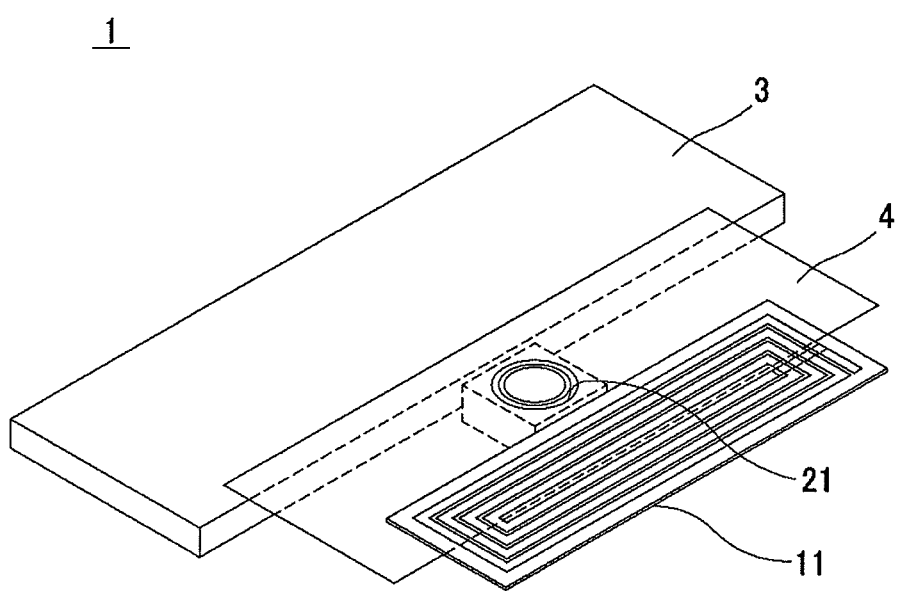
FIG. 10 is a perspective view illustrating an antenna device in which metal foil having an opening portion overlaps a metal plate and an antenna substrate.

Furthermore, as illustrated in FIG. 9, in the antenna device 1, a plurality of the metal foil 4 may overlap the metal plate 3 and the antenna substrate 11. Thus, for example, even in the case where the metal foil 4 cannot be provided between the metal plate 3 and the antenna substrate 11 due to a lens barrel of a camera module disposed therebetween, the metal foil 4 provided in a position to avoid other members, such as a lens barrel, allows communication characteristics to be improved. Likewise, as illustrated in FIG. 10, for the antenna device 1, there may be employed metal foil 4 having an opening portion 21 or a notched portion (not illustrated) accommodating other members, such as a lens barrel.

Figure 11A:
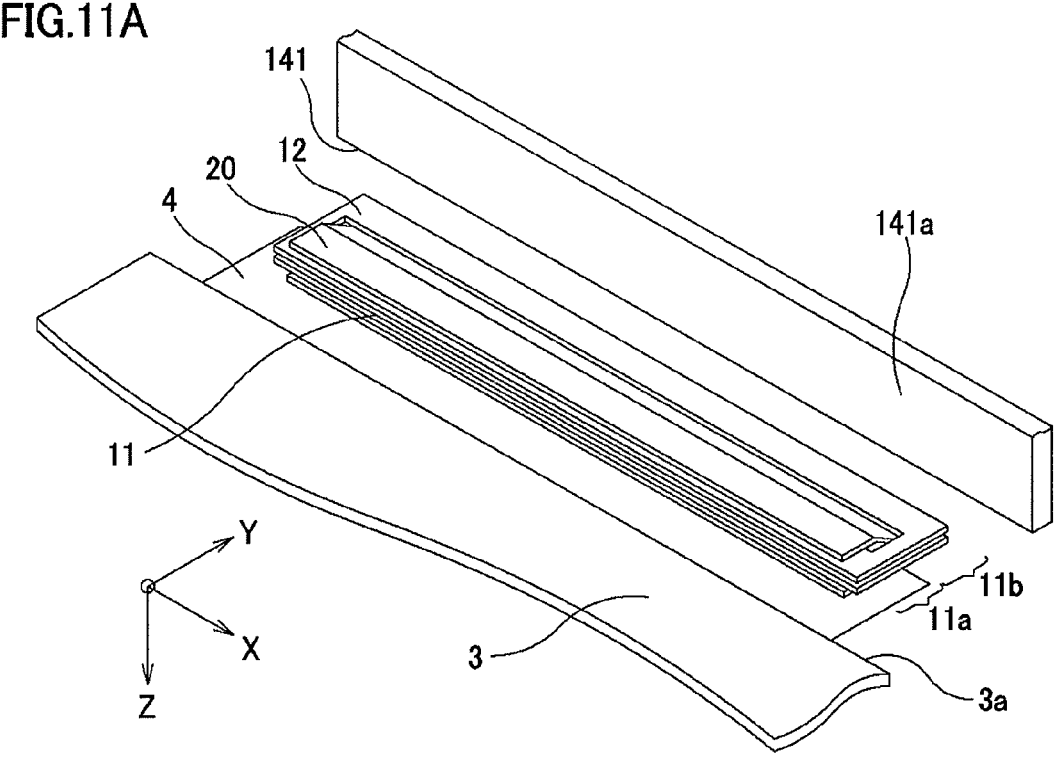
FIG. 11A and FIG. 11B illustrate an antenna substrate into which a magnetic sheet is inserted.
Figure 12A:
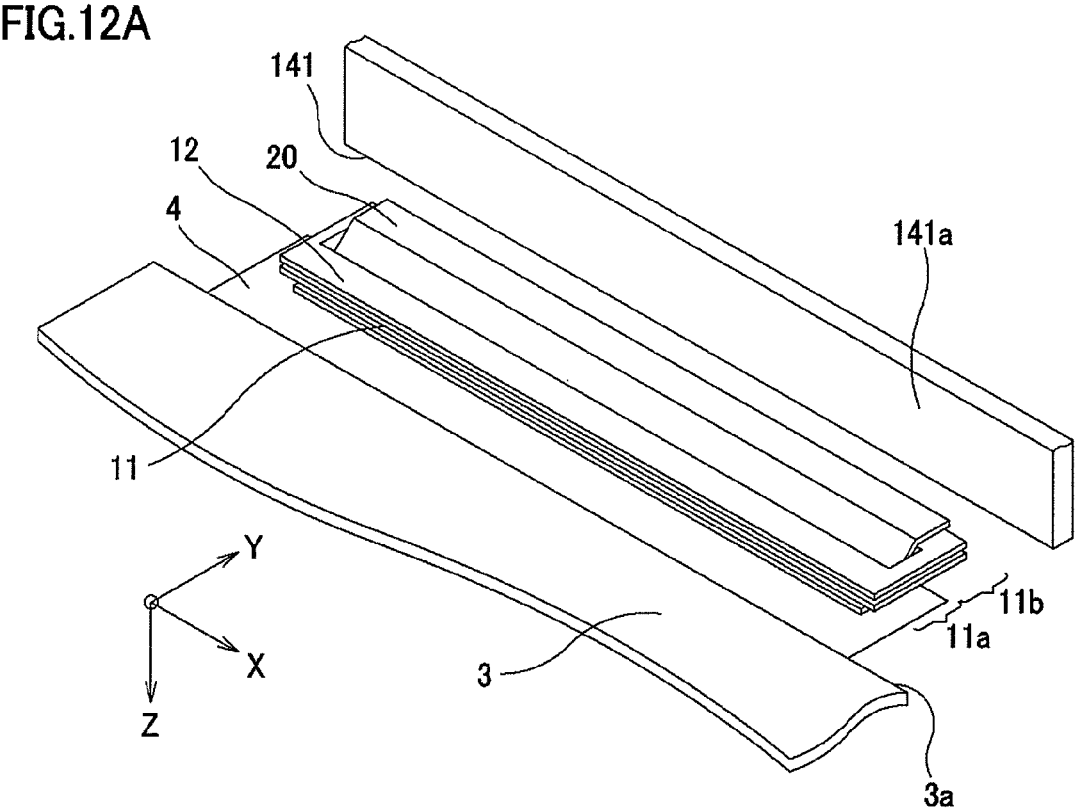
FIG. 12A and FIG. 12B illustrate an antenna substrate into which a magnetic sheet is inserted.

As illustrated in FIG. 11A and FIG. 12A, the antenna module 2 may be formed by inserting the magnetic sheet 20 into the antenna substrate 11. This antenna substrate 11 is such that an opening portion is formed in the center 12a of the antenna coil 12 over the longitudinal direction thereof and the magnetic sheet 20 is inserted into this opening portion.

Figure 11B:
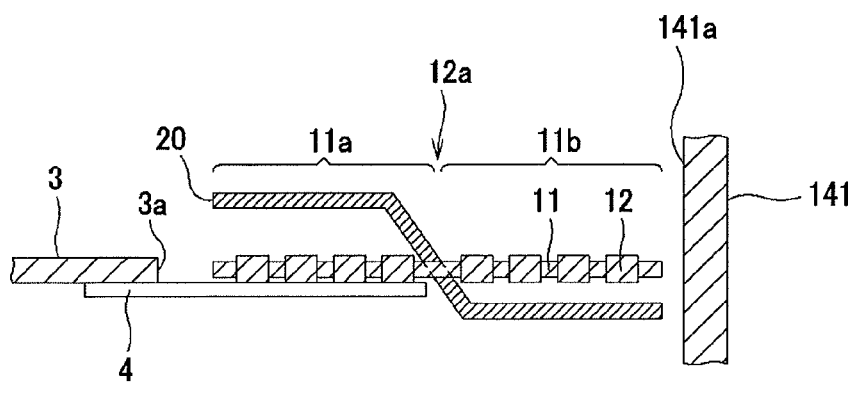
Figure 11B:
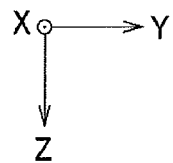

The antenna substrate 11 illustrated in FIG. 11A is formed in such a manner that, as illustrated in FIG. 11B, the magnetic sheet 20 is inserted into an opening portion formed in the center 12a of the antenna coil 12 in such a way that, on the one side 11a, the magnetic sheet 20 is positioned closer to the reader/writer 120 than the antenna coil 12 is, meanwhile, on the another side 11b, the antenna coil 12 is positioned closer to the reader/writer 120 than the magnetic sheet 20 is.

Figure 12B:
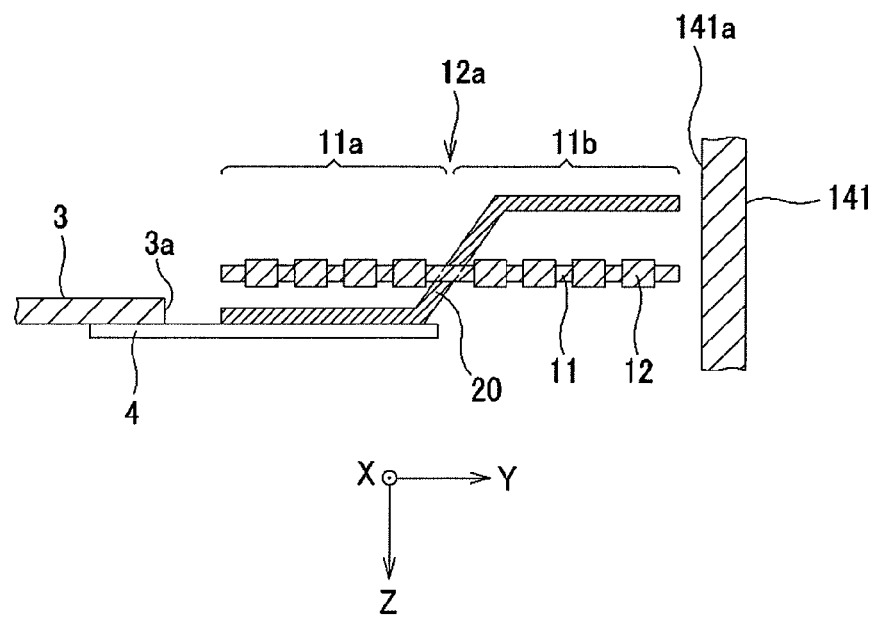

The antenna substrate 11 illustrated in FIG. 12A is formed in such a manner that, as illustrated in FIG. 12B, the magnetic sheet 20 is inserted into an opening portion formed in the center 12a of the antenna coil 12 in such a way that, on the one side 11a, the antenna coil 12 is positioned closer to the reader/writer 120 than the magnetic sheet 20 is, meanwhile, on the another side 11b, the magnetic sheet 20 is positioned closer to the reader/writer 120 than the antenna coil 12 is.

Modified Example of the Form of the Antenna Substrate

Figure 13:
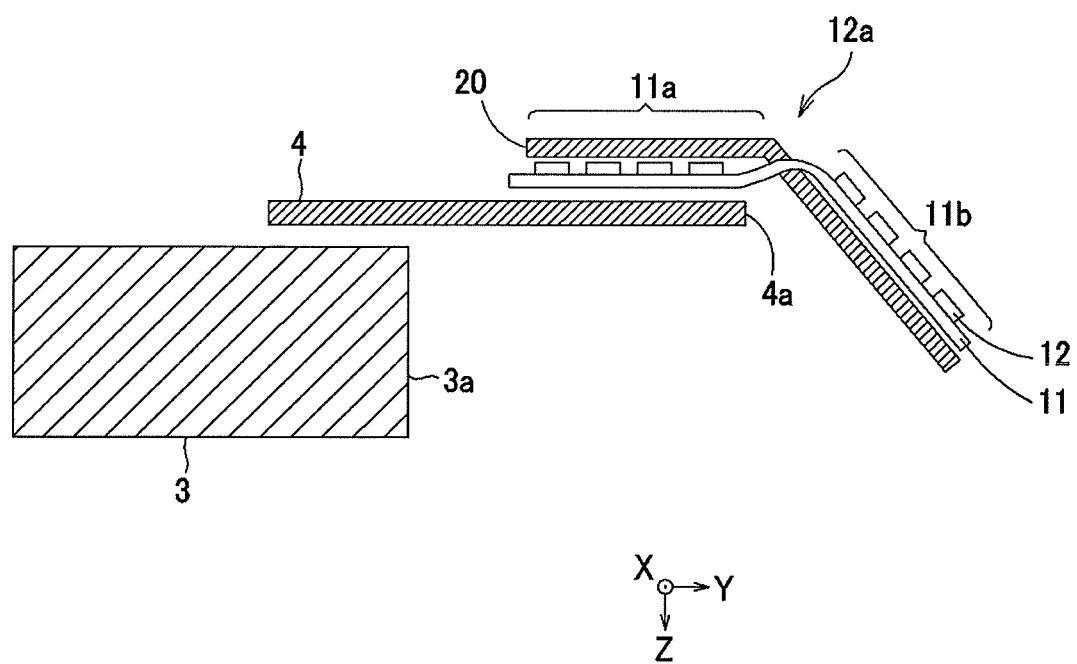
FIG. 13 is a cross-sectional view illustrating a state in which the another side of an antenna substrate having a magnetic sheet inserter thereinto is bent toward a side opposite to a reader/writer.
Figure 14A:
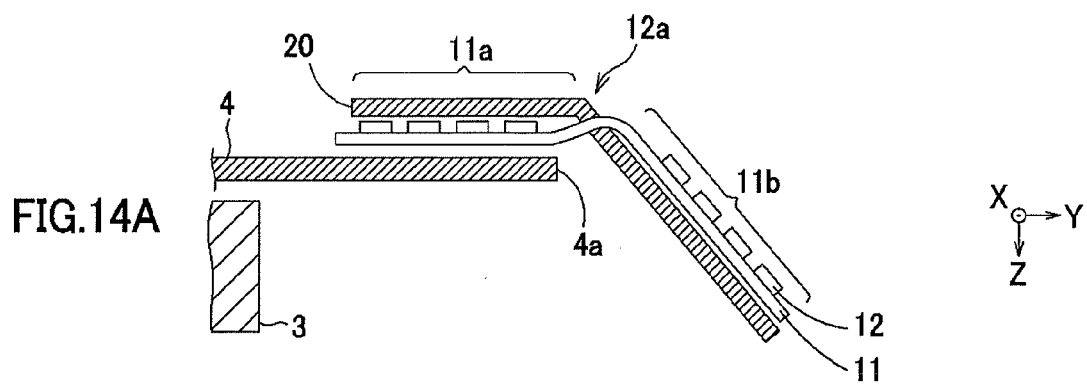
FIG. 14A to FIG. 14D are cross-sectional views illustrating different variations on how to bend the antenna substrate illustrated FIG. 13.
Figure 14B:
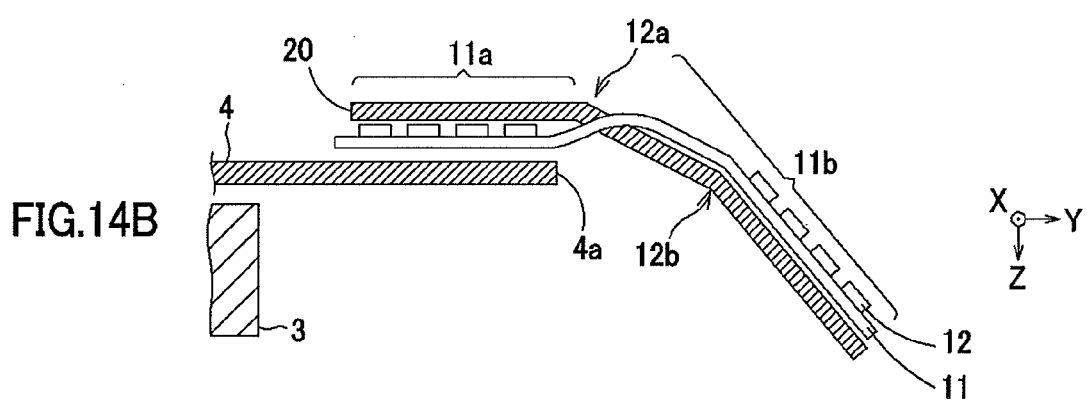
Figure 14C:
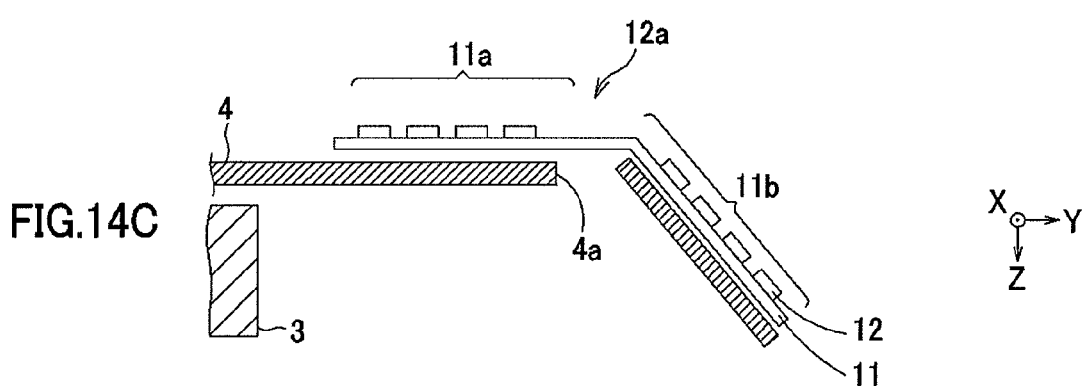
Figure 14D:
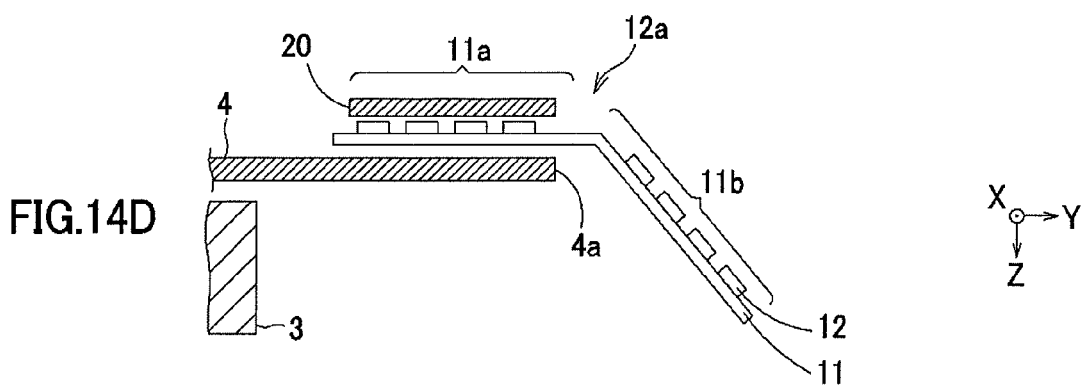

As illustrated in FIG. 13, the one side 11a of the antenna substrate 11 (from an end portion of one side of the antenna substrate 11 to the center thereof) is covered with the metal foil 4, and, furthermore, the another side 11b is bent at the center 12a of the antenna coil 12 in a direction farther from the reader/writer 120, whereby a magnetic field concentrated onto an end portion 4a of the metal foil 4 can be more efficiently induced to the magnetic sheet 20 on the another side 11b. The magnetic field induced to the another side 11b causes a large electromotive force in the antenna coil 12, whereby communication characteristics can be further improved.

As illustrated in FIG. 14, there are some variations in the way of bending the antenna substrate. As illustrated in FIG. 14A, the center 12a of the antenna coil 12 into which the magnetic sheet 20 is inserted may be shifted in such a way that the length of the one side 11a differs from that of the another side 11b. Furthermore, as illustrated in FIG. 14B, the another side 11b may be further bent at a bending position 12b on the another side 11b in a direction farther from the reader/writer 120, or bent to have a circular-arc shape (a curved surface). As illustrated in FIG. 14C, the magnetic sheet 20 may be disposed only on the another side 11b of the antenna substrate 11, or alternatively, as illustrated in FIG. 14D, the magnetic sheet 20 may be disposed only on the one side 11a of the antenna substrate 11.

Example of Mounting the Antenna Substrate onto a Cover Unit of a Device

Figure 15A:
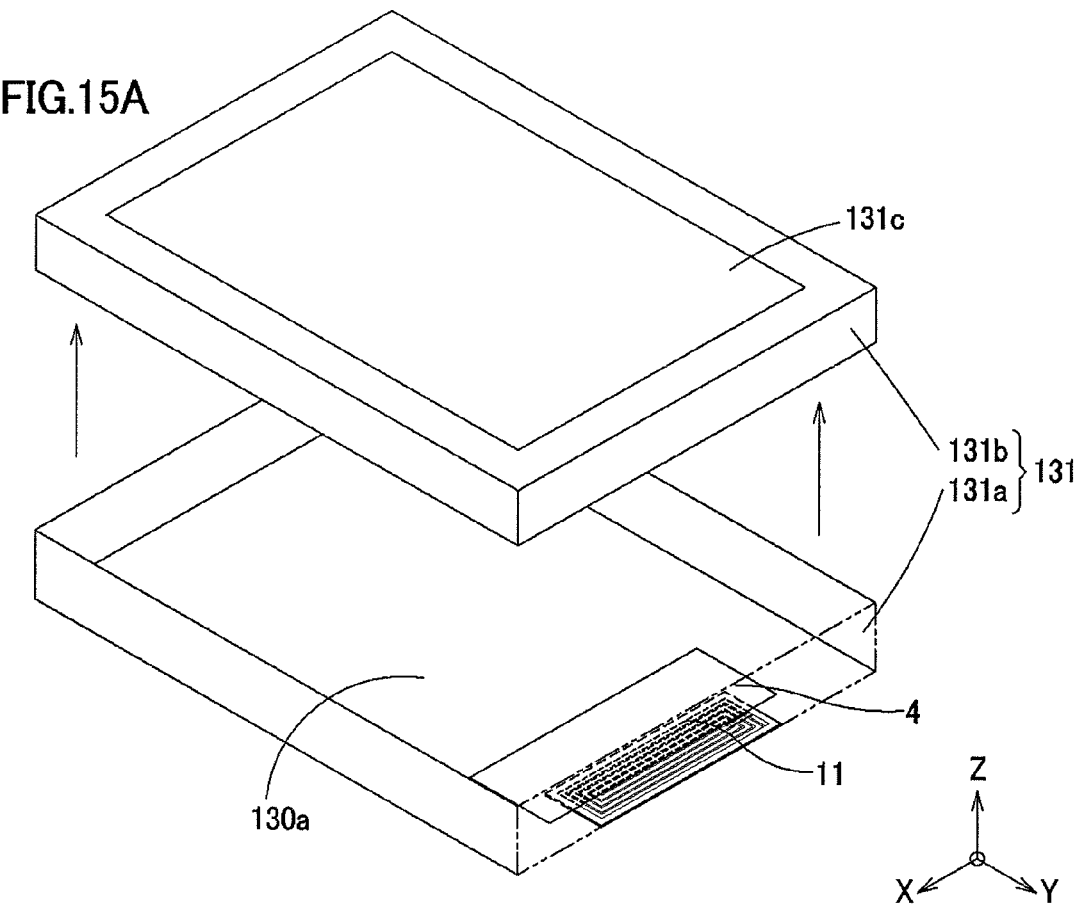
FIG. 15A to FIG. 15C illustrate a configuration in which, while an antenna substrate is disposed in one of two divided casing members constituting a casing, metal foil is disposed in such a way as to cover a part of an antenna coil.

As illustrated in FIG. 15A, a casing 131 of a smart phone 130 comprises: one casing member 131a having an antenna substrate 11 on board of an inner surface 130a; and another casing member 131b having a battery and a control circuit of a main body on board, the circuit including a liquid crystal panel 131*c* and CPU. The casing 131 is configured in such a way that the casing member 131*b* including the control circuit of the main body is coupled to the one casing member 131*a* in such a way as to cover the one casing member 131*a*. The casing members 131*a* and 131*b* are removably coupled to each other by a well-known method, such as a screw fixation or a combination of an engaging hook and an engaging hole. Besides the antenna substrate 11, other functional modules, such as a camera module, may be on board of the casing member 131*a*, alone or in combination in advance. By a user of the smart phone 130, the casing member 131*a* having functional modules, such as the antenna substrate 11, on board may be removed from the casing member 131*b*, and, instead, another casing member having other functional modules on board may be attached to the casing member 131*b*.

Figure 15B:
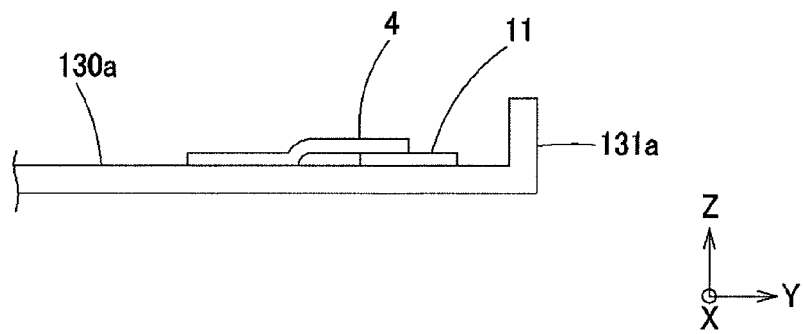

The antenna substrate 11 is in advance on board of the casing member 131*a* to be used like a cover, and the antenna substrate 11 is disposed in such a way that a plane including the antenna coil 12 faces the reader/writer 120 via the casing member 131*a*. The antenna substrate 11 is preferably disposed in the vicinity of the external wall of the casing member 131*a*. As illustrated in FIG. 15B, the metal foil 4 is disposed so as to cover a part of the antenna coil 12. The metal foil 4 is preferably disposed so as to cover an inner wall portion of the casing member 131*a* from the center 12*a* of the antenna coil 12 in an inward direction of the casing member 131*a*. The metal foil 4 may cover most of the inner wall portion in an inward direction of the casing member 131*a*.

Figure 15C:
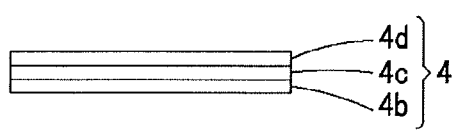

For example, as illustrated in FIG. 15C, the metal foil 4 may have an adhesive layer 4*b* formed by applying an adhesive to one surface of a high conductive metal 4*c*, such as Cu, and an insulating layer 4*d* made of resin or the like and formed on the other surface of the high conductive metal 4*c*. With the adhesive layer 4*b*, the metal foil 4 is attached in such a way as to touch the antenna substrate 11 and an inner wall portion of the casing member 131*a*. An insulating adhesive is preferably employed as the adhesive used for the adhesive layer 4*b*, and the use of the insulating adhesive allows the metal foil 4 to be insulated from metal wiring, such as a lead wire of the antenna coil 12. Furthermore, in the case where the metal foil 4 has the insulating layer 4*d*, the metal foil 4 is also insulated from a metal portion of a control circuit and the like mounted inside the casing member 131*b*.

Figure 16A:
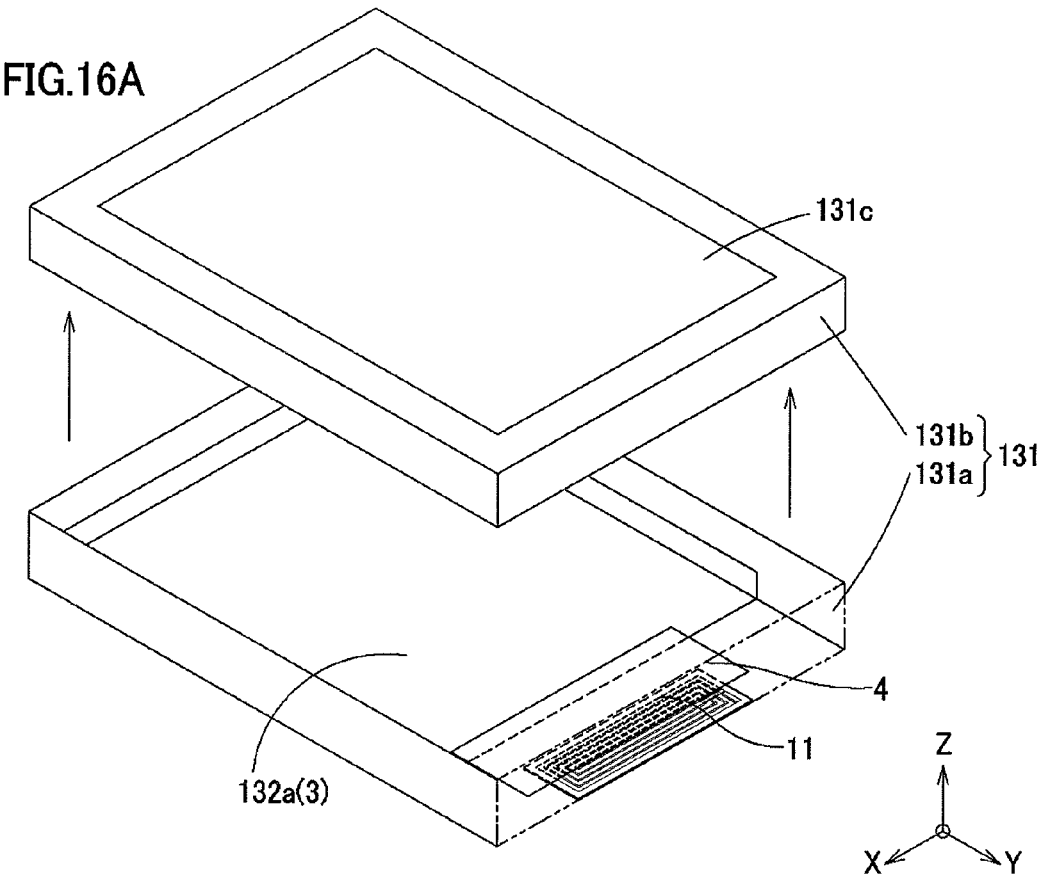
FIG. 16A and FIG. 16B illustrate a configuration in which, while an antenna substrate and a metal cover are disposed in one of two divided casing members constituting a casing, metal foil is disposed in such a way as to cover a part of an antenna coil and a part of the metal cover.
Figure 16B:
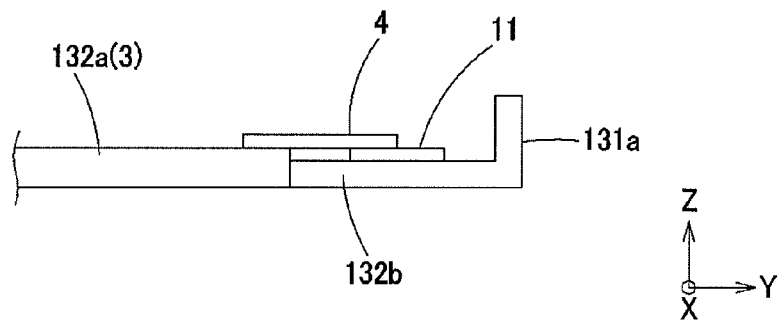

In order to achieve a design that allows an electronic apparatus itself to exhibit a fine appearance, and to compensate for insufficient strength due to the slimming down of casings, a case has been increasing in which the casing member 131*a* is formed of a composite material obtained by compositing a metal material, such as a magnesium alloy, and a resin material. In other words, the casing member 131*a* comprises a metal cover portion 132*a* formed of a metal material, and a resin portion 132*b* formed of a resin material. As illustrated in FIG. 16A, the metal foil 4 is disposed in such a way as to cover a part of the antenna coil 12 and a part of the metal cover portion 132*a*. As illustrated in FIG. 16B, as in the case of FIG. 15, the metal foil 4 is preferably disposed from the center 12*a* of the antenna coil 12 in an inward direction of the metal cover portion 132*a*. It should be noted that, to improve the strength of a base and attain a finer appearance, the base of the whole of the casing member 131*a* may be formed of resin or the like, and the metal cover portion 132*a* may be formed by coating the inner surface or the outer surface of the base with metal. In such case, likewise, the metal foil 4 is disposed in such a way as to cover a part of the antenna coil 12 and a part of the metal cover portion 132*a*.

Figure 17A:
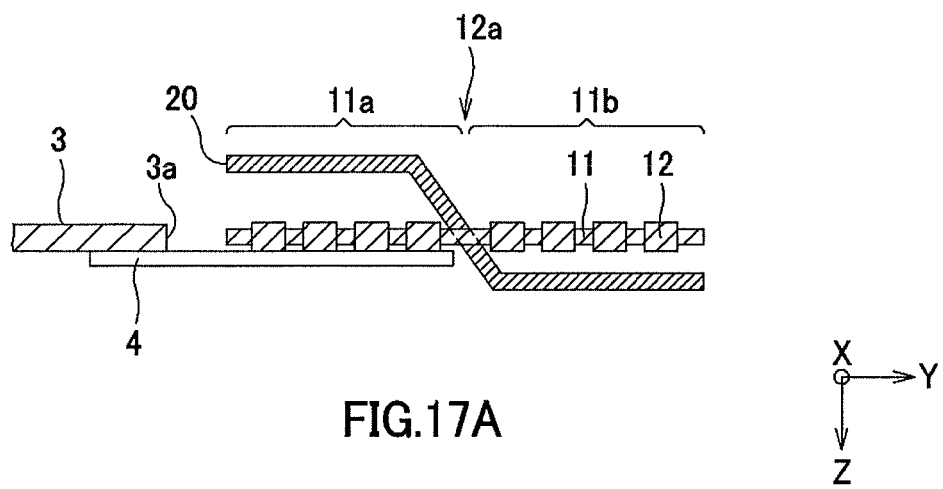
FIG. 17A and FIG. 17B each illustrate configuration examples in which an antenna substrate is disposed in one of two divided casing members constituting a casing.
Figure 17B:
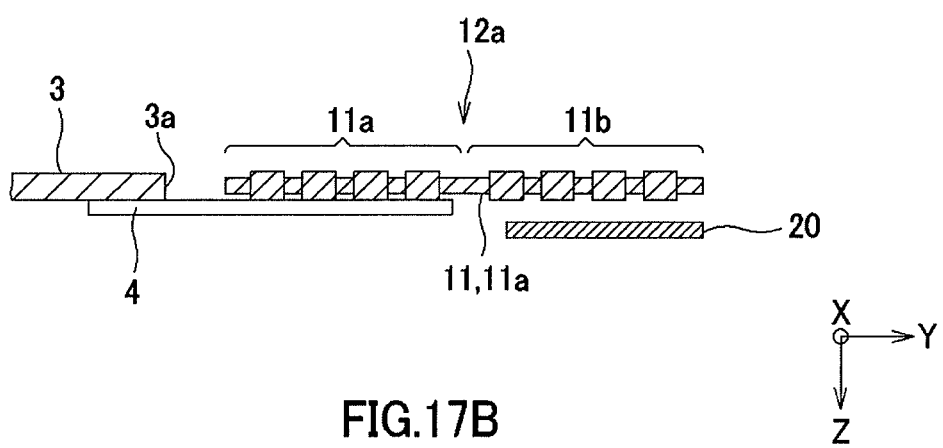

The configuration of the antenna module 2 may be such that, as illustrated in FIG. 17A, on a side on which the metal foil 4 is attached, the magnetic sheet 20 is disposed on a surface side opposite to the metal foil 4 with respect to the antenna coil 12, meanwhile, on a side beyond an end portion of the metal foil 4, the magnetic sheet 20 is disposed on the same surface side as the metal foil 4 with respect to the antenna coil 12. Alternatively, the configuration of the antenna module 2 may be such that, as illustrated in FIG. 17B, on the side beyond an end portion of the metal foil 4, the magnetic sheet is disposed only on the same surface side as the metal foil 4 with respect to the antenna coil 12.

It should be noted that the metal foil 4 is suitable for reduction in thickness, weight, and cost, but, it is not necessary to employ a thin metal foil, and it is a matter of course that, depending on the form or the like, a thicker metal plate or the like may be employed. For example, in the case of contactless communication using a carrier frequency of 13.56 MHz, it is beneficial that a metal portion of the metal foil 4 has a thickness of approximately 1 μm or more. The use of the metal foil 4 (or a metal plate) having a greater thickness enables communication at a lower frequency and power transfer of a contactless charging system.

The metal foil 4 is attached in such a way as to cover a part of the antenna coil 12 disposed in an inner wall portion of the casing member 131*a*, whereby the position of the antenna substrate 11 and the position of the metal foil 4 can be optimized, and, not depending on the internal structure of an electronic apparatus, the performance of an antenna can be optimized.

Furthermore, the use of a tape comprising the metal foil 4 having both sides thus processed allows the reception sensitivity of an antenna to be optimized by later adding the metal foil 4 in the vicinity of and around the antenna.

It is a matter of course that, also in the case where an antenna is mounted as illustrated in FIG. 15 and FIG. 16, as in the cases of FIG. 13 and FIG. 14, the another side of the antenna substrate 11, the side not being overlapped by the metal foil 4, may be bent in a direction (the normal direction of z) opposite to a direction facing the reader/writer 120.

Modified Example of the Form of the Metal Foil 4

In the above-mentioned embodiment, the principal surface of the metal foil 4 is disposed in such a way as to overlap or be in contact with a surface of the metal plate 3 in parallel, the surface facing the reader/writer 120. Here, the metal plate 3 is not limited to a material having a relatively small thickness, such as a plate or foil, and may sometimes include a metal portion having a considerable degree of thickness, such as a metal can of a battery pack, and, in order to concentrate a magnetic field onto a predetermined position of an antenna by making use of the effects of shielding magnetic flux caused by the metal plate 3 and the metal foil 4, a side face portion of the metal plate 3, such as a battery pack, may be made use of.

Figure 18A:
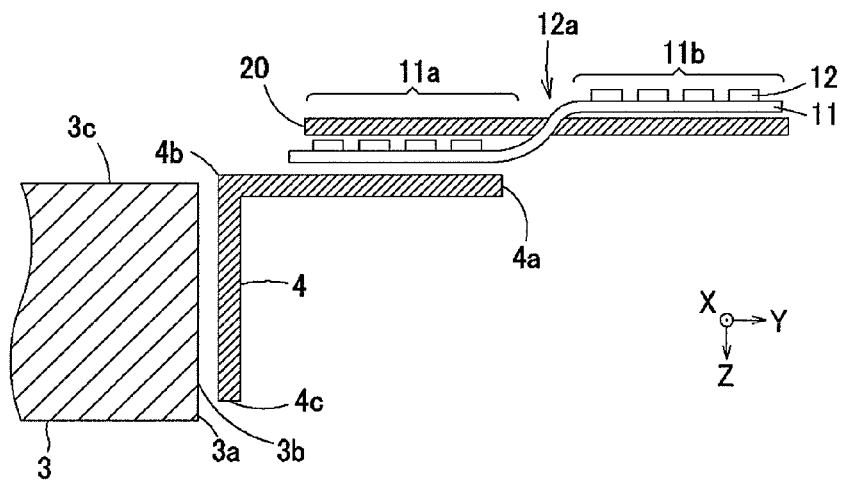
FIG. 18A to FIG. 18C are cross-sectional views illustrating modified examples of the form of metal foil.
Figure 18B:
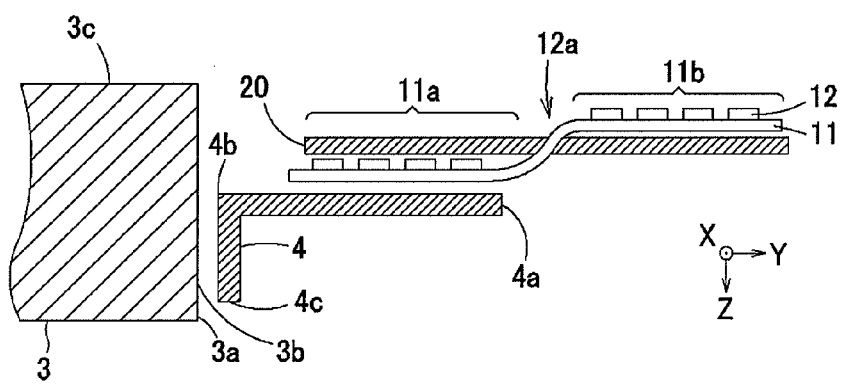
Figure 18C:
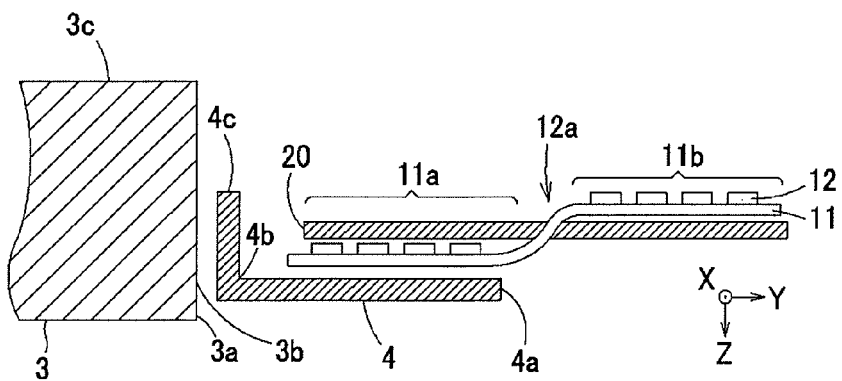

For example, as illustrated in FIG. 18A to FIG. 18C, the metal foil 4 disposed to overlap the one side 11*a* of the antenna coil 12 may be arranged in such a manner that the metal foil 4 is bent at a bent portion 4*b*, and a surface thereof from the bent portion 4*b* to an end portion 4*c* is disposed to be adjacent to and along a side face 3*b* on the side of an end portion 3*a* of the metal plate 3.

FIG. 18A illustrates a state in which the metal foil 4 is bent at an almost right angle in a direction (the normal direction of z) to position the end portion 4c away from the reader/writer 120. As illustrated in FIG. 18A, the bent portion 4b may be positioned closer to the reader/writer 120 than to a surface 3c of the metal plate 3, the surface 3c facing the reader/writer 120. Here, as is the case with the above-mentioned embodiment, on the one side 11a of the antenna coil 12, the magnetic sheet 20 is disposed closer to the reader/writer 120 than the antenna coil 12 is, meanwhile, on the another side 11b, the antenna coil 12 is disposed closer to the reader/writer 120 than the magnetic sheet 20 is.

Furthermore, as illustrated in FIG. 18B, the bent portion 4b of the metal foil 4 may be positioned more distant from the reader/writer 120 than the surface 3c of the metal plate 3 is, the surface 3c facing the reader/writer 120. Alternatively, although not illustrated, it is matter of course that the bent portion 4b may be arranged on the same plane as the surface 3c of the metal plate 3, the surface 3c facing the reader/writer 120.

As illustrated in FIG. 18C, the metal foil 4 may be bent at an almost right angle in a direction to position the end portion 4c closer to the reader/writer 120.

Figure 19A:
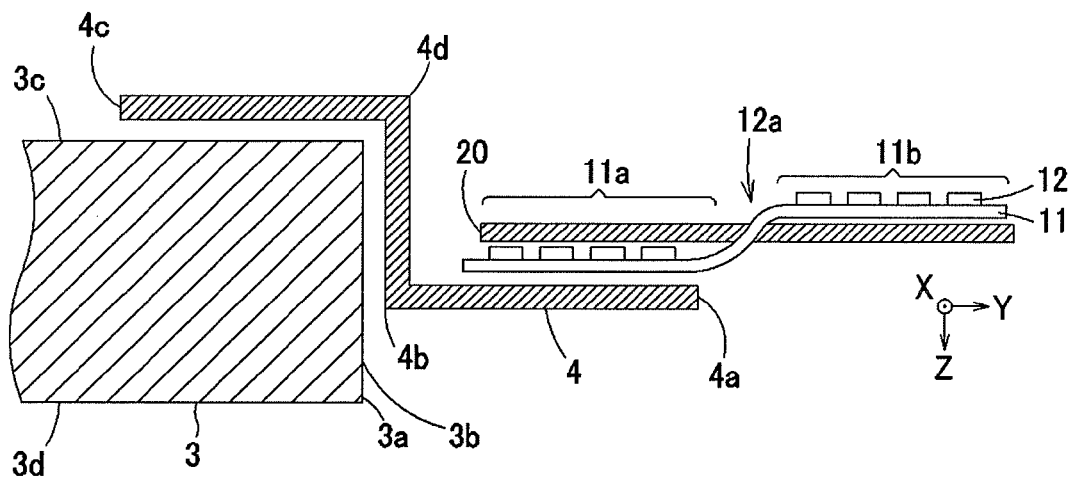
FIG. 19A and FIG. 19B are cross-sectional views illustrating other modified examples of the form of metal foil.

Furthermore, as illustrated in FIG. 19A, the metal foil 4 is not limited to being adjacently disposed only along the side face of the metal plate 3, but, may extend from the side face 3b of the end portion 3a of the metal plate 3 to the surface 3c of the metal plate 3, the surface 3c facing the reader/writer 120, and disposed along the surface 3c. In other words, the metal foil 4 may be bent at the bent portion 4b in a direction to position the end portion 4c closer to the reader/writer 120, and, further bent at a bent portion 4d in such a way as to overlap the surface 3c facing the reader/writer 120.

Figure 19B:
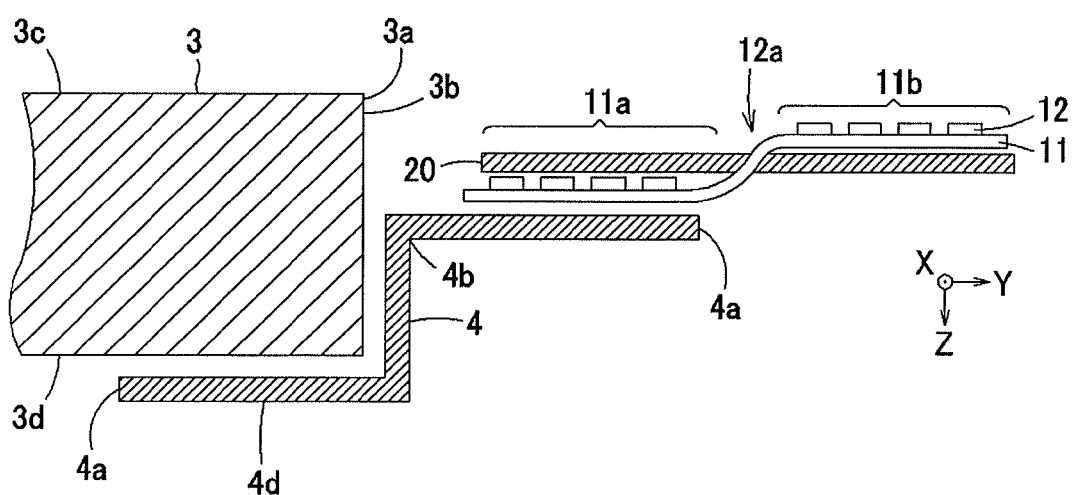

As illustrated in FIG. 19B, the metal foil 4 may be disposed in such a way as to be bent at the bent portion 4b toward a surface 3d opposite to the surface 3c facing the reader/writer 120, thereby overlapping the surface 3d.

Also in the case where the principal surface of the metal foil 4 is thus adjacently disposed along a surface including a side face of the metal plate 3, the effects of shielding magnetic flux allows a magnetic field to be concentrated onto the vicinity of the center 12a of an antenna. In the case where the metal foil 4 is bent in such a way that the principal surface is adjacently disposed to be parallel to the side face of the metal plate 3, if the metal plate 3 is, for example, a metal can portion of the battery pack 134, there is an advantage that the metal foil 4 is conveniently not obstructive at the time of removing the battery back 134 from the main body of a device.

It is a matter of course that the metal foil 4 is not limited to being adjacently disposed along at least the side face of the metal plate 3, and may be in contact with a surface including the side face of the metal plate. Furthermore, a bending angle of the metal foil 4 may be 90 degrees as illustrated and may be other angles, and, in accordance with the form of the end portion of the metal plate 3, the metal foil 4 may be adjacently disposed at an arbitrary angle and in an arbitrary form along the surface of the end portion of the metal plate 3, or may be in contact with the surface of the end portion thereof.

The magnetic sheet 20 is not limited to being disposed in such a way as to overlap both the one side 11a and the another side 11b of the antenna coil 12, and may be disposed only on the one side 11a or disposed only on the another side 11b.

Example

Next, Examples will be described by making comparisons between the antenna device 1 according to the present invention, the antenna device 1 using the metal foil 4, and an antenna device not using the metal foil 4.

Comparative Example

Figure 20A:
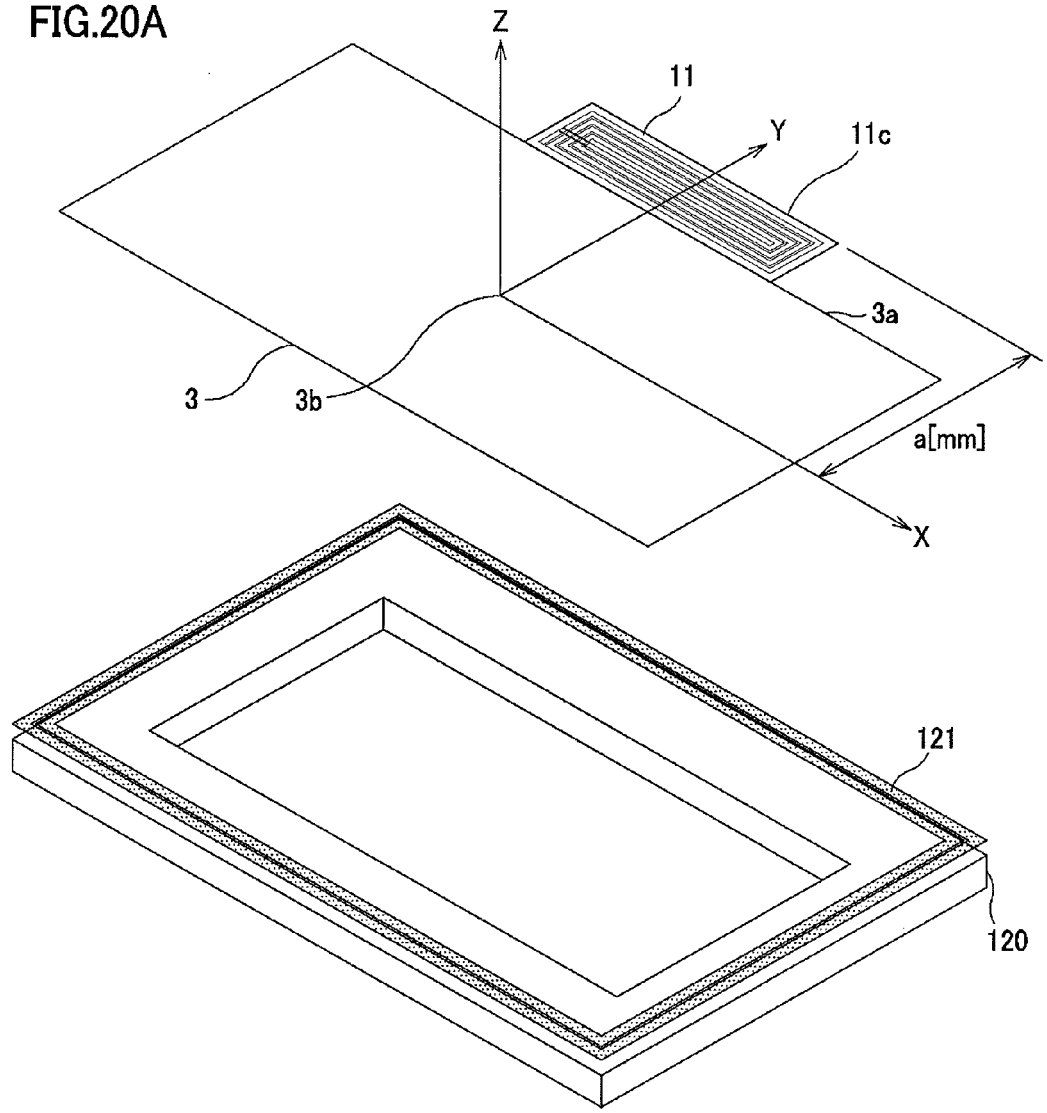
FIG. 20 is a perspective view illustrating an antenna device according to Comparative Example.
Figure 20B:
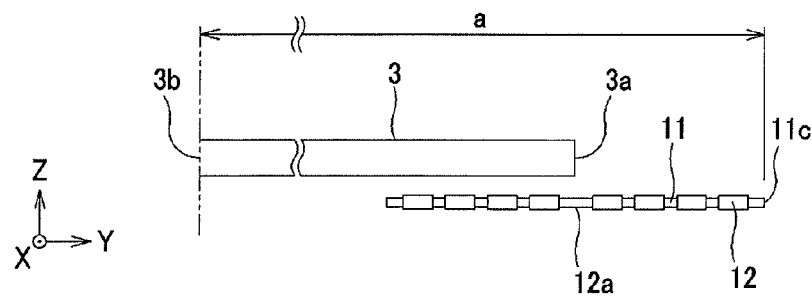

In an antenna device according to Comparative Example, the metal plate 3 and the reader/writer 120 face each other as illustrated in FIG. 20, and there were evaluated communication characteristics when a relative-positional relationship between the metal plate 3 and the antenna substrate 11 was changed.

Specific evaluation conditions were as follows. That is, an antenna 121 of the reader/writer 120 was a coil of two turns, the coil having an external shape of 66 mm×100 mm defined in the x- and y-axis directions. Furthermore, the metal plate 3 was stainless steel having dimensions of 100 mm×50 mm×0.3 mm defined in the x-, y-, and z-axis directions. The antenna coil 12 of the antenna substrate 11 was a coil of four turns, the coil having an external shape of 40 mm×10 mm defined in the x- and y-axis directions. Furthermore, the distance defined in the z-axis direction between the surface of the metal plate 3 and the surface of the antenna coil 12 was 1 mm.

Here, as a value indicating a relative-positional relationship between the metal plate 3 and the antenna substrate 11, the following a was applied. That is, a represents a distance defined in the y-axis direction between the center portion 3b of the metal plate 3 and the end portion 11c of the another side 11b of the antenna substrate 11.

Figure 21:
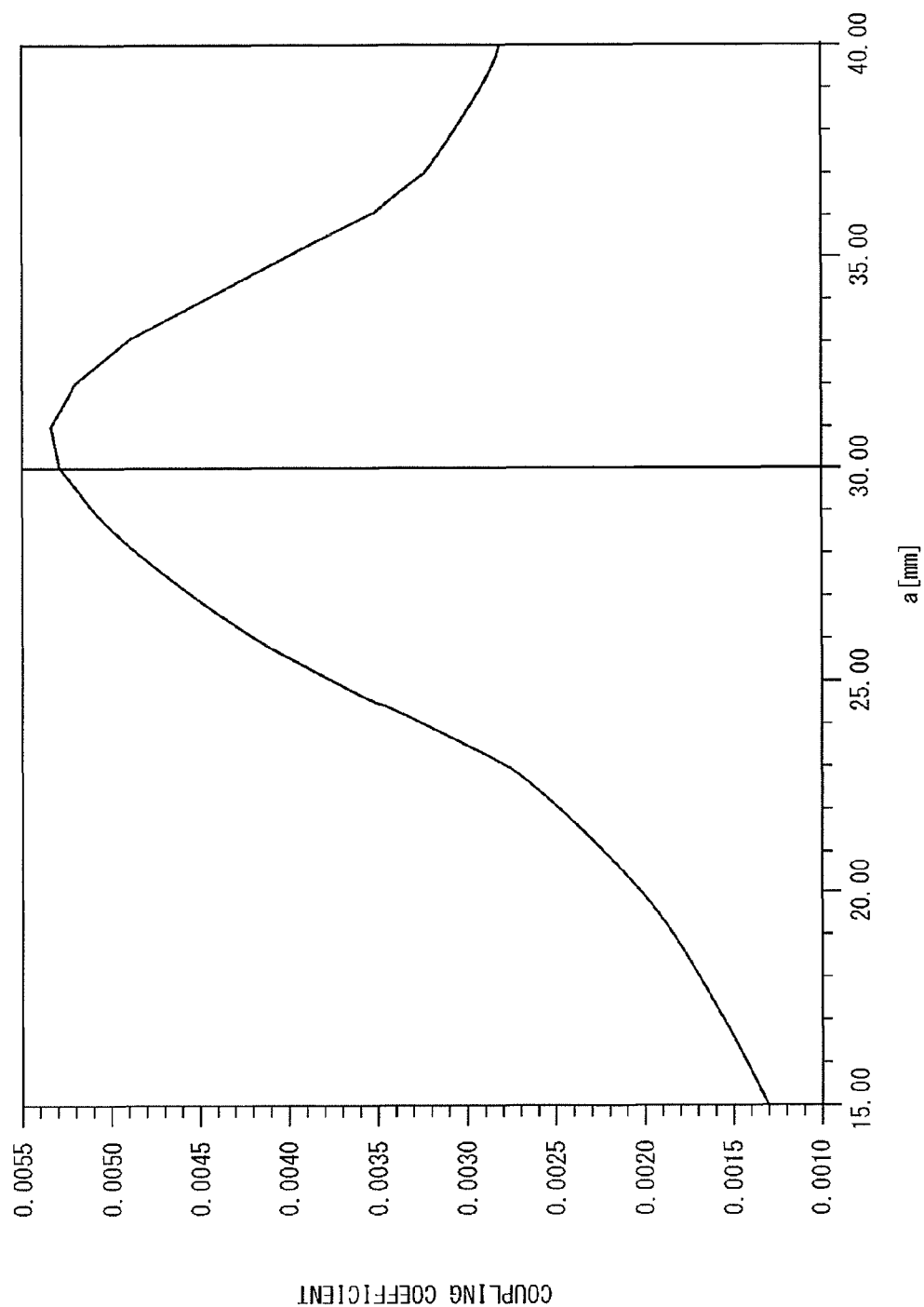
FIG. 21 is a graph showing a change in coupling coefficient according to Comparative Example.

Under the above-mentioned conditions, the coupling coefficient of the antenna coil 12 when the value of a was varied from 15 mm to 40 mm was determined by simulation. FIG. 21 shows variations in coupling coefficient.

Here, since the width of the metal plate 3 is 50 mm, when the value of a is 25 mm, the end portion 3a of the metal plate 3 coincides with an end portion 11c of the another side 11b of the antenna substrate 11. Furthermore, since the width of the antenna substrate 11 is 10 mm, when the value of a is 35 mm, the end portion 3a of the metal plate 3 coincides with an end portion 11d of the one side 11a of the antenna substrate 11.

As indicated in FIG. 21, when the value of a is 30 mm, in other words, when the end portion 3a of the metal plate 3 approximately coincides with the center of the antenna substrate 11 in the short-side direction thereof, the coupling coefficient peaks, and, as the value of a moves away from 30 mm, the coupling coefficient decreases. Moreover, when the values of a are 25 mm and 35 mm, the coupling coefficients are almost the same. Thus, the coupling coefficient is high when the antenna coil 12 is disposed in the vicinity of the end portion 3a of the metal plate 3, and this is because the flux density around the end portion 3a of the metal plate 3 is high. Furthermore, an eddy current is generated when the metal plate 3 receives a magnetic field transmitted from the reader/writer 120, and this is because the end portion 3a has a stronger magnetic field than the center portion 3b, thereby allowing magnetic energy received from the reader/writer 120 to be efficiently transmitted to the antenna coil 12.

It should be noted that, when a case in which the value of a is varied to be smaller than 25 mm is compared with a case in which the value of a is varied to be larger than 35 mm, in both the cases, the coupling coefficients decrease, but, in the case in which the value of a is varied to be larger than 35 mm, a degree of decrease in coupling coefficient with respect to variations in the value of a is smaller. For example, when a case in which the value of a is 22 mm is compared with a case in which the value of a is 38 mm, the case in which the value of a is 38 mm results in an approximately 20% higher coupling coefficient. Furthermore, when a case in which the value of a is 20 mm is compared with a case in which the value of a is 40 mm, the case in which the value of a is 40 mm results in an approximately 40% higher coupling coefficient.

Example

Figure 22A:
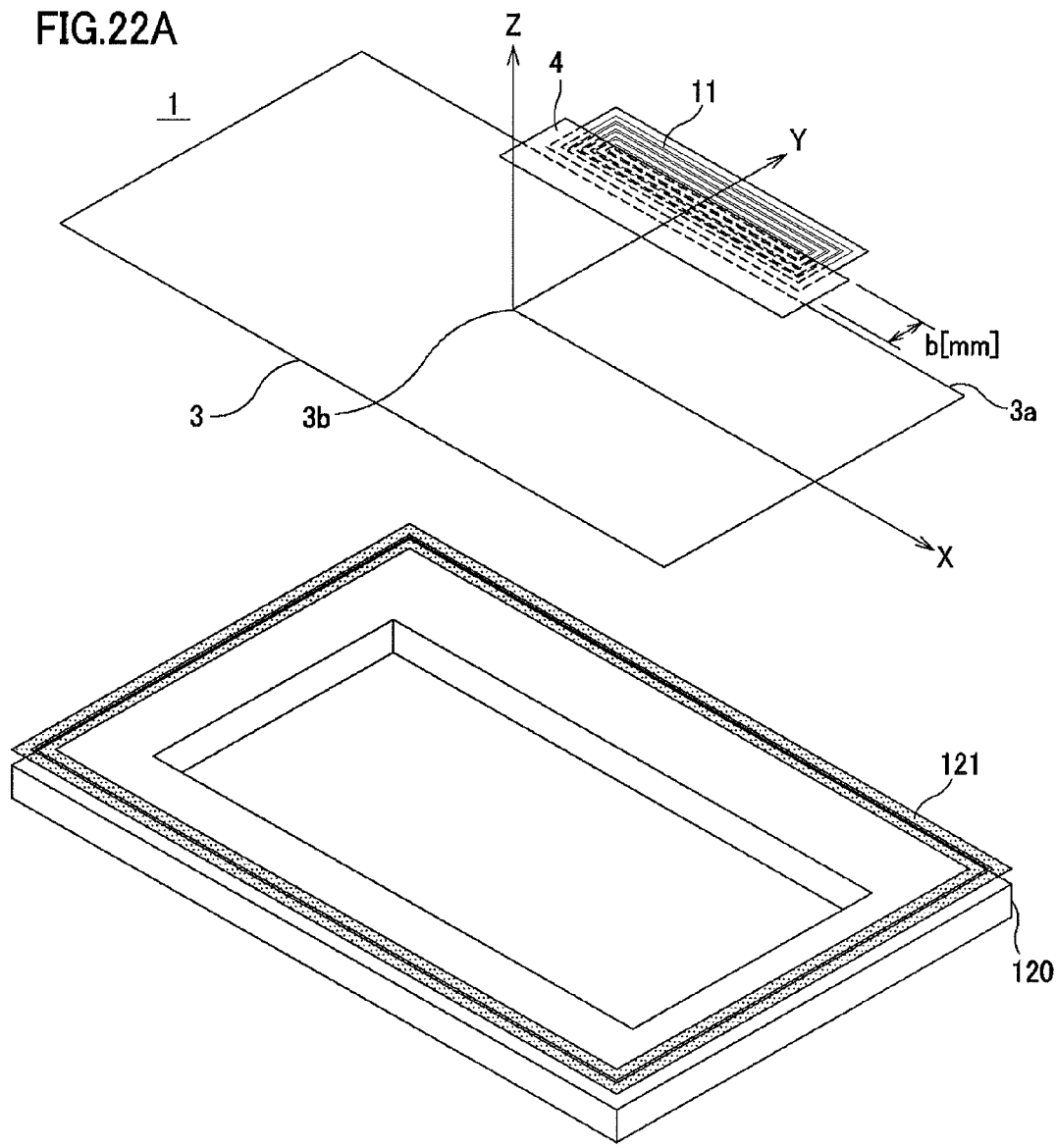
FIG. 22 is a perspective view illustrating an antenna device according to Example.
Figure 22B:
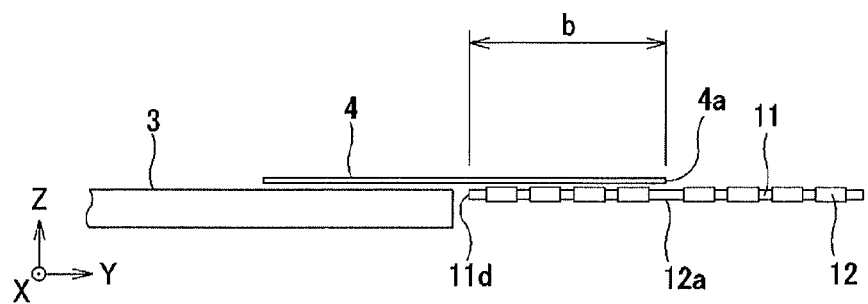

In the present Example, as illustrated in FIG. 22, the metal plate 3 and the reader/writer 120 were arranged to face each other, and the metal plate 3 and the antenna substrate 11 were overlapped by the metal foil 4 on a side of the metal plate 3 and the antenna substrate 11, the side being opposite to the reader/writer 120. The antenna substrate 11 was arranged in such a way as to be adjacent to the end portion 3a of the metal plate 3. Under this state, there were evaluated communication characteristics when a relative-positional relationship between the metal foil 4 and the antenna substrate 11 was changed.

Specific evaluation conditions, namely, the dimension of the external shape, the structure, and the disposition of each of the reader/writer 120, the antenna 121, the metal plate 3, the antenna substrate 11, and the antenna coil 12 were the same as those in Comparative Example. As the metal foil 4, copper foil having an external shape with a size of 50 mm×10 mm was employed, and the metal foil 4 was arranged to overlap and cover the full width of the antenna substrate 11 in the longitudinal direction thereof.

Here, as a value indicating a relative-positional relationship between the antenna substrate 11 and the metal foil 4 overlapping the antenna substrate 11, the following b was applied. That is, b represents an overlapping distance defined in the y-axis direction from the end portion 11d of the one side 11a of the antenna substrate 11 to the end portion 4a of the metal foil 4 on the side closer to the antenna substrate 11.

Figure 23:
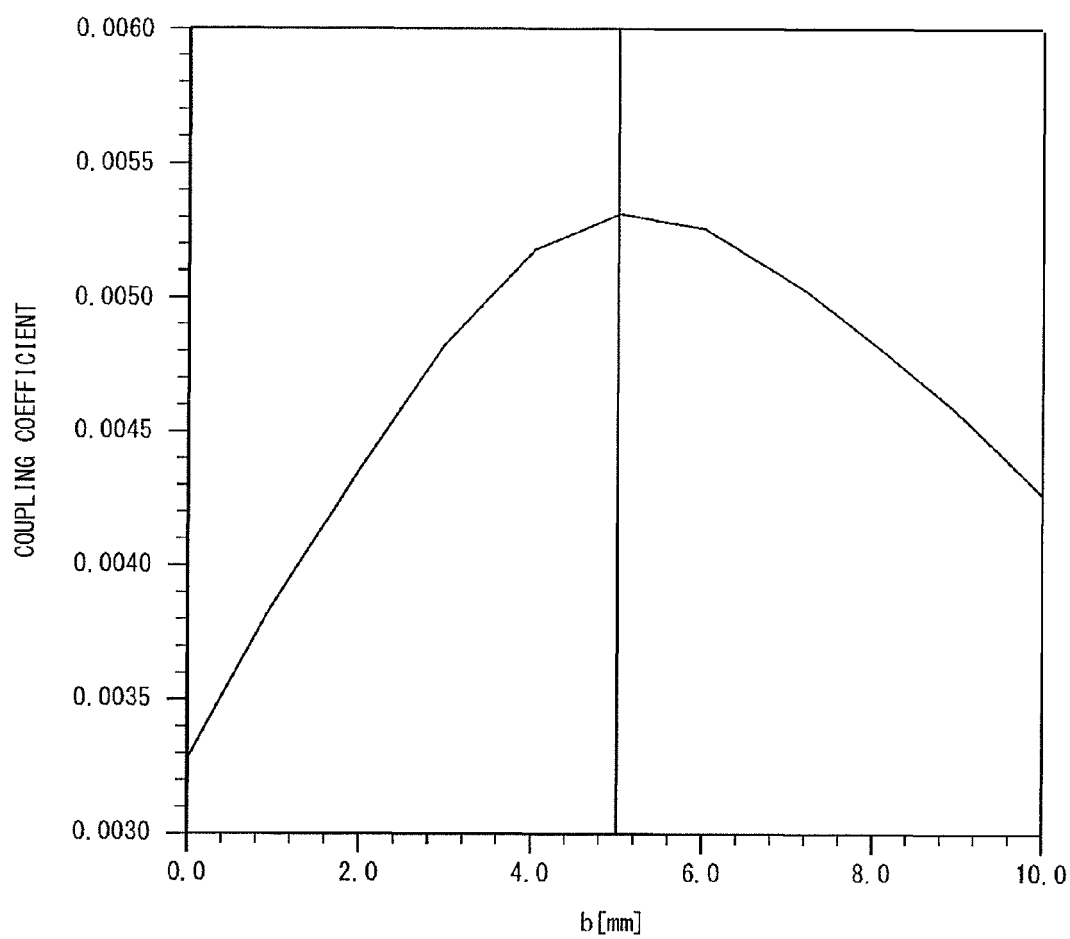
FIG. 23 is a graph showing a change in coupling coefficient according to Example.

Under the above-mentioned conditions, the coupling coefficient of the antenna coil 12 when the value of b was varied from 0 mm to 10 mm was determined by simulation. FIG. 23 shows variations in coupling coefficient.

Since the antenna substrate 11 has a width of 10 mm, when the value of b is 5 mm, the metal foil 4 overlaps the whole of the one side 11a positioned across the center 12a of the antenna coil 12 from the another side 11b. Furthermore, when the value of b is 0 mm, the metal foil 4 never overlaps the antenna substrate 11, on the other hand, when the value of b is 10 mm, the metal foil 4 overlaps the whole of the antenna substrate 11.

As illustrated in FIG. 23, when the value of b is 5 mm, in other words, when the metal foil 4 overlaps the whole of the one side 11a of the antenna substrate 11, the one side 11a being positioned across the center 12a of the antenna coil 12 from the another side, the coupling coefficient peaks and the peak value of the coupling coefficient was equivalent to the coupling coefficient of the antenna device according to Comparative Example (the coupling coefficient: 0.0053).

In other words, in the antenna device 1, the metal foil 4 is arranged in such a way as to overlap the metal plate 3 and the antenna substrate 11, whereby a magnetic field in the overlapping area is repelled thereby to control inductive coupling, and currents generated in the non-overlapping area can be efficiently transmitted, and, furthermore, without leakage of magnetic flux from the metal plate 3, the magnetic flux can be induced to an area of the antenna substrate 11, the area not being overlapped by the metal foil 4, whereby efficient inductive coupling can be performed. As a result, a coupling coefficient equivalent to the coupling coefficient of the antenna device according to Comparative Example is achieved, and also a higher degree of flexibility in disposition of the antenna substrate 11 with respect to the metal plate 3 can be provided.

It should be noted that, in the above, the antenna device formed by winding the antenna coil 12 on the antenna substrate 11 was described, but, it is a matter of course that the above-mentioned configuration may be applied to an antenna device in which the antenna coil 12 is not formed on the antenna substrate 11.

Figure 24:
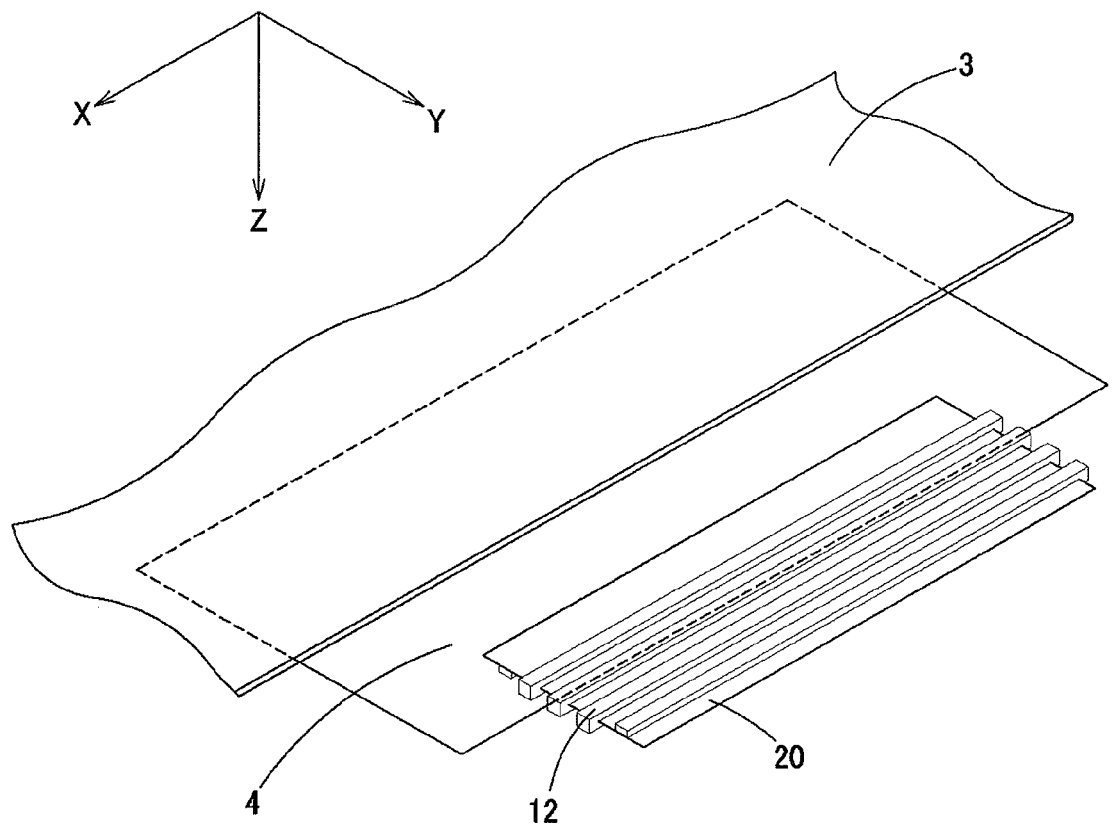
FIG. 24 is a perspective view illustrating a configuration example in which an antenna coil is wound around a magnetic sheet.

For example, as illustrated in FIG. 24, the antenna coil 12 may be wound around the magnetic sheet 20, and a part of the antenna coil 12 may be disposed in such a way as to be overlapped by the metal foil 4 disposed in such a way as to overlap a part of the metal plate 3. Furthermore, the antenna coil 12 having such configuration may be applied to the above-mentioned various embodiments.

REFERENCE SIGNS LIST

1 . . . antenna device, 2 . . . antenna module, 3 . . . metal plate, 3a . . . end portion, 3b . . . center portion, 4 . . . metal foil, 4a . . . end portion, 4b . . . adhesive layer, 4c . . . high conductive metal, 4d . . . insulating layer, 11 . . . antenna substrate, 11a . . . one side, 11b . . . another side, 12 . . . antenna coil, 12a . . . center, 12b . . . bending position, 13 . . . communication processing unit, 14 . . . terminal unit, 20 . . . magnetic sheet, 100 wireless communication system, 120 . . . reader/writer, 121 . . . antenna, 141 . . . outer casing, 141a . . . inner circumference wall, 142 . . . space.

The invention claimed is:

1. An antenna device incorporated into an electronic apparatus and configured to communicate with an external device via an electromagnetic field signal, the antenna device comprising:
    a first electric conductor provided inside a casing of the electronic apparatus and facing the external device;
    an antenna coil provided inside the casing of the electronic apparatus and inductively coupled to the external device; and
    a second electric conductor in sheet form, the second electric conductor being provided inside the casing of the electronic apparatus, overlapping or being in contact with the first electric conductor, and at least partially overlapping a surface of the antenna coil, the surface being opposite to a surface facing the external device, and the first electric conductor overlapping the surface of the antenna coil,
    wherein the second electric conductor overlaps one side of the antenna coil, the one side having a lead wire wound around thereon in one direction, and does not overlap another side of the antenna coil, the another side having the lead wire wound around thereon in another direction, and
    wherein the number of turns of the antenna coil on the one side overlapped by the second electric conductor is smaller than the number of turns of the antenna coil on the another side not overlapped by the second electric conductor.

2. The antenna device according to claim 1, wherein the second electric conductor overlaps the one side of the antenna coil over a full width of said one side.

3. The antenna device according to claim 1, wherein the antenna coil is overlapped by a plurality of the second electric conductors.

4. The antenna device according to claim 1, wherein the second electric conductor has an opening portion or a notched portion formed to avoid other structures provided inside the electronic apparatus.

5. The antenna device according to claim 1, wherein the second electric conductor is metal foil.

6. The antenna device according to claim 1, further comprising a magnetic sheet configured to induce a magnetic field transmitted from the external device in the antenna coil,
   wherein the antenna coil and the magnetic sheet overlap each other in such a way that said magnetic sheet is inserted into a center portion of said antenna coil, thereby satisfying both disposition conditions, one of the disposition conditions being such that, on a center side of a casing surface facing the external device, said magnetic sheet is positioned closer to the external device than said antenna coil is, another one of the disposition conditions being such that, on an outer circumference side of said casing surface, said antenna coil is positioned closer to said external device than said magnetic sheet is.

7. An antenna device incorporated into an electronic apparatus and configured to communicate with an external device via an electromagnetic field signal, the antenna device comprising:
   a first electric conductor provided inside a casing of the electronic apparatus and facing the external device;
   an antenna coil provided inside the casing of the electronic apparatus and inductively coupled to the external device; and
   a second electric conductor in sheet form, the second electric conductor being provided inside the casing of the electronic apparatus, overlapping or being in contact with the first electric conductor, and at least partially overlapping a surface of the antenna coil, the surface being opposite to a surface facing the external device, and the first electric conductor overlapping the surface of the antenna coil,
   wherein the second electric conductor overlaps one side of the antenna coil, the one side having a lead wire wound around thereon in one direction, and does not overlap another side of the antenna coil, the another side having the lead wire wound around thereon in another direction,
   wherein the above-mentioned another side of the antenna coil is bent toward a direction opposite to a side facing the external device.

8. An antenna device incorporated into an electronic apparatus and configured to communicate with an external device via an electromagnetic field signal,
   the antenna device comprising:
      a first electric conductor provided inside a casing of the electronic apparatus and facing the external device;
      an antenna coil provided on an inner surface of one member constituting the casing of the electronic apparatus and inductively coupled to the external device; and
      a second electric conductor provided in the one member in such a way as to partially overlap the antenna coil, and the first electric conductor overlapping a surface of the antenna coil configured to face the external device,
      wherein the second electric conductor overlaps one side of the antenna coil, the one side having a lead wire wound around thereon in one direction, and does not overlap another side of said antenna coil, the another side having said lead wire wound around thereon in another direction,
      wherein the number of turns of the antenna coil on the one side overlapped by the second electric conductor is smaller than the number of turns of the antenna coil on the another side not overlapped by said second electric conductor.

9. The antenna device according to claim 8, wherein the second electric conductor overlaps the one side of the antenna coil over a full width of said one side.

10. The antenna device according to claim 8, wherein the antenna coil is overlapped by a plurality of the second electric conductors.

11. The antenna device according to claim 8, wherein the second electric conductor has an opening portion or a notched portion formed to avoid other structures provided inside the electronic apparatus.

12. The antenna device according to claim 8, wherein the second electric conductor is metal foil.

13. The antenna device according to claim 8, further comprising a magnetic sheet configured to induce a magnetic field transmitted from the external device in the antenna coil,
   wherein the antenna coil and the magnetic sheet overlap each other in such a way that said magnetic sheet is inserted into a center portion of said antenna coil, thereby satisfying both disposition conditions, one of the disposition conditions being such that, on a center side of a casing surface facing the external device, said magnetic sheet is positioned closer to the external device than said antenna coil is, another one of the disposition conditions being such that, on an outer circumference side of said casing surface, said antenna coil is positioned closer to said external device than said magnetic sheet is.

14. The antenna device according to claim 8, wherein
   the above-mentioned one member includes a metal portion constituting a part of said one member, and
   the metal portion overlaps a part of the second electric conductor.

15. The antenna device according to claim 14, wherein the second electric conductor overlaps one side of the antenna coil, the one side having a lead wire wound around thereon in one direction, and does not overlap another side of the antenna coil, the another side having the lead wire wound around thereon in another direction.

16. The antenna device according to claim 15, wherein the second electric conductor overlaps the one side of the antenna coil over a full width of said one side.

17. The antenna device according to claim 15, wherein the above-mentioned another side of the antenna coil is bent toward a direction opposite to a side facing the external device.

18. An antenna device incorporated into an electronic apparatus and configured to communicate with an external device via an electromagnetic field signal,
   the antenna device comprising:
      a first electric conductor provided inside a casing of the electronic apparatus and facing the external device;
      an antenna coil provided on an inner surface of one member constituting the casing of the electronic apparatus and inductively coupled to the external device; and a second electric conductor provided in the one member in such a way as to partially overlap the antenna coil, and the first electric conductor overlapping a surface of the antenna coil configured to face the external device, wherein the second electric conductor overlaps one side of the antenna coil, the one side having a lead wire wound around thereon in one direction, and does not overlap another side of said antenna coil, the another side having said lead wire wound around thereon in another direction, wherein the above-mentioned another side of the antenna coil is bent toward a direction opposite to a side facing the external device.

19. The antenna device according to claim 18, wherein the antenna coil is overlapped by a plurality of the second electric conductors.

20. The antenna device according to claim 18, wherein the second electric conductor has an opening portion or a notched portion formed to avoid other structures provided inside the electronic apparatus.

21. The antenna device according to claim 18, wherein the second electric conductor is metal foil.

22. The antenna device according to claim 18, further comprising a magnetic sheet configured to induce a magnetic field transmitted from the external device in the antenna coil, wherein the antenna coil and the magnetic sheet overlap each other in such a way that said magnetic sheet is inserted into a center portion of said antenna coil, thereby satisfying both disposition conditions, one of the disposition conditions being such that, on a center side of a casing surface facing the external device, said magnetic sheet is positioned closer to the external device than said antenna coil is, another one of the disposition conditions being such that, on an outer circumference side of said casing surface, said antenna coil is positioned closer to said external device than said magnetic sheet is.

23. An antenna device incorporated into an electronic apparatus and configured to communicate with an external device via an electromagnetic field signal, the antenna device comprising:
   a first electric conductor provided inside a casing of the electronic apparatus and facing the external device;
   an antenna coil provided on an inner surface of one member constituting the casing of the electronic apparatus and inductively coupled to the external device; and
   a second electric conductor provided in the one member in such a way as to partially overlap the antenna coil, and the first electric conductor overlapping a surface of the antenna coil configured to face the external device,
   wherein the above-mentioned one member includes a metal portion constituting a part of said one member, and the metal portion overlaps a part of the second electric conductor,
   wherein the second electric conductor overlaps one side of the antenna coil, the one side having a lead wire wound around thereon in one direction, and does not overlap another side of the antenna coil, the another side having the lead wire wound around thereon in another direction,
   wherein the number of turns of the antenna coil on the one side overlapped by the second electric conductor is smaller than the number of turns of the antenna coil on the another side not overlapped by the second electric conductor.

* * * * *